(12) United States Patent
Choi et al.

(10) Patent No.: US 12,550,980 B2
(45) Date of Patent: Feb. 17, 2026

(54) FOOTWEAR INCLUDING UPPERS WITH MIDFOOT AND/OR FOREFOOT SUPPORTING MEMBERS

(71) Applicant: NIKE, Inc., Beaverton, OR (US)

(72) Inventors: Yoon Jeong Choi, Portland, OR (US); Carl L. Madore, Portland, OR (US); Matthew J. Plumb, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/661,168

(22) Filed: May 10, 2024

(65) Prior Publication Data

US 2024/0381976 A1 Nov. 21, 2024

Related U.S. Application Data

(60) Provisional application No. 63/502,232, filed on May 15, 2023.

(51) Int. Cl.
*A43B 23/04* (2006.01)
*A43B 7/14* (2022.01)
(Continued)

(52) U.S. Cl.
CPC .......... *A43B 23/045* (2013.01); *A43B 7/1495* (2013.01); *A43C 5/00* (2013.01); *A43C 9/00* (2013.01); *A43C 15/164* (2013.01)

(58) Field of Classification Search
CPC ..... A43B 23/04; A43B 23/045; A43B 23/047; A43B 23/026; A43B 23/07; A43B 7/1495; A43C 1/00; A43C 5/00
See application file for complete search history.

(56) References Cited

U.S. PATENT DOCUMENTS 697,344 A * 4/1902 Leland ..................... A43C 5/00
24/713.6
794,838 A * 7/1905 Baker ....................... A43C 3/00
24/712
(Continued)

FOREIGN PATENT DOCUMENTS

EP 0570621 A1 11/1993
FR 1332097 A 12/1963
(Continued)

OTHER PUBLICATIONS

W Gaviota 4, «https://berkshirerunningcenter.com/w-gaviota/», Mar. 13, 2023, 3 pages.
(Continued)

*Primary Examiner* — Ted Kavanaugh
(74) *Attorney, Agent, or Firm* — Banner & Witcoff, Ltd.

(57) ABSTRACT

Footwear uppers include: (a) a first upper member (formed from one or more component parts) including: one or more lace-engaging openings formed as elongated through hole openings with a length dimension extending in a top-to-bottom direction of the upper and a width dimension extending in a heel-to-toe direction of the upper, and wherein the length dimension is at least two times larger than the width dimension; (b) one or more midfoot supporting gussets located inside the first upper member, the midfoot supporting gusset(s) including one or more lace-engaging through holes (configured to pair up with the corresponding one or more lace-engaging openings of the first upper member); and (c) a lace extending through the lace-engaging opening(s) and the lace-engaging through hole(s). When the lace is tightened, the lace-engaging through hole(s) will at least partially align with a portion of its corresponding lace-engaging opening.

20 Claims, 19 Drawing Sheets

(51) Int. Cl.
  *A43C 5/00* (2006.01)
  *A43C 9/00* (2006.01)
  *A43C 15/16* (2006.01)

(56) References Cited

U.S. PATENT DOCUMENTS

| | | | |
|---|---|---|---|
| 1,384,565 A * | 7/1921 | Martin | A43C 5/00 24/701 |
| 1,434,723 A * | 11/1922 | Triay, Jr. | A43C 5/00 24/713.2 |
| 1,603,144 A | 10/1926 | Nichols | |
| 2,345,057 A | 3/1944 | Marinetti | |
| 2,539,761 A | 1/1951 | Whitman | |
| 2,591,211 A * | 4/1952 | Spencer | A43B 3/26 36/97 |
| 2,798,309 A | 7/1957 | Wustemann | |
| 3,323,232 A | 6/1967 | Danowsky | |
| 4,811,500 A | 3/1989 | Maccano | |
| 4,899,466 A | 2/1990 | Skaja | |
| 4,916,833 A * | 4/1990 | Nwoko | A43C 5/00 24/712.2 |
| 5,214,863 A | 6/1993 | Skaja | |
| 5,319,869 A | 6/1994 | McDonald et al. | |
| 5,678,329 A | 10/1997 | Griffin et al. | |
| 5,692,319 A | 12/1997 | Parker et al. | |
| 5,784,808 A | 7/1998 | Hockerson | |
| 5,907,912 A | 6/1999 | Alaimo | |
| 5,992,057 A | 11/1999 | Monti | |
| 6,029,376 A * | 2/2000 | Cass | A43C 1/04 36/51 |
| 6,453,579 B1 | 9/2002 | Luprete | |
| D517,297 S | 3/2006 | Jones et al. | |
| 7,073,279 B2 | 7/2006 | Min | |
| 7,086,181 B2 | 8/2006 | Farys | |
| 8,061,059 B2 | 11/2011 | Bruce et al. | |
| 8,161,666 B2 | 4/2012 | Liles | |
| 8,479,415 B2 | 7/2013 | Berger et al. | |
| 9,565,898 B2 | 2/2017 | Mahoney | |
| 9,763,495 B2 | 9/2017 | Takada et al. | |
| 10,051,918 B2 | 8/2018 | Dombrow et al. | |
| 10,405,606 B2 | 9/2019 | Farris et al. | |
| 10,631,595 B2 * | 4/2020 | Tanev | A43C 5/00 |
| 10,945,491 B2 | 3/2021 | Cooper | |
| 11,083,248 B2 | 8/2021 | Schneider et al. | |
| 11,122,853 B2 | 9/2021 | Smith et al. | |
| 11,206,898 B2 | 12/2021 | Cobb | |
| 2002/0148142 A1 | 10/2002 | Oorei et al. | |
| 2010/0071230 A1 | 3/2010 | Hassid et al. | |
| 2011/0197475 A1 | 8/2011 | Weidl et al. | |
| 2012/0246973 A1 | 10/2012 | Dua | |
| 2013/0104422 A1 | 5/2013 | Hatfield et al. | |
| 2014/0202042 A1 | 7/2014 | Berend et al. | |
| 2015/0121724 A1 | 5/2015 | Sung | |
| 2018/0255877 A1 * | 9/2018 | Wilson | A43B 23/0245 |
| 2018/0360167 A1 | 12/2018 | Zoulamian | |
| 2019/0082792 A1 | 3/2019 | Cooper | |
| 2019/0246742 A1 * | 8/2019 | Cooper | A43C 5/00 |
| 2019/0246743 A1 * | 8/2019 | Cooper | A43B 5/10 |
| 2019/0350314 A1 | 11/2019 | Pauk et al. | |
| 2021/0368940 A1 * | 12/2021 | Haugbro | A43C 11/008 |
| 2023/0263268 A1 | 8/2023 | Cooper | |

FOREIGN PATENT DOCUMENTS

| | | |
|---|---|---|
| FR | 2501977 B3 | 2/1983 |
| GB | 2465973 B | 1/2013 |
| KR | 101902109 B1 | 9/2018 |

OTHER PUBLICATIONS

Army Dark Gum Trainer+ (Men's) $139.00, nobullproject.com, Mar. 13, 2023, 7 pages.
Chuck Taylor All Star Lugged 2.0 Rugged Basics, converse.com, «https://www.converse.com/shop/p/chuck-taylor-all-star-lugged-2.0-rugged-basics-unisex-high-top-shoe/A05124C_085.html . . .», Mar. 13, 2023, 7 pages.
Pro/SL Sport Women/Breathable Waterproof Golf Shoe, FootJoy, «https://www.footjoy.com/women/golf-shoes/spikeless/pro%7Csl-sport-women . . .», Mar. 10, 2023, 8 pages.
Kapalua Men's Golf Shoes—Poi, »https://olukai.com/products/kapalua-mens-golf-shoes-poi-charcoal?currency=USD. . .», Mar. 10, 2023, 5 pages.

* cited by examiner

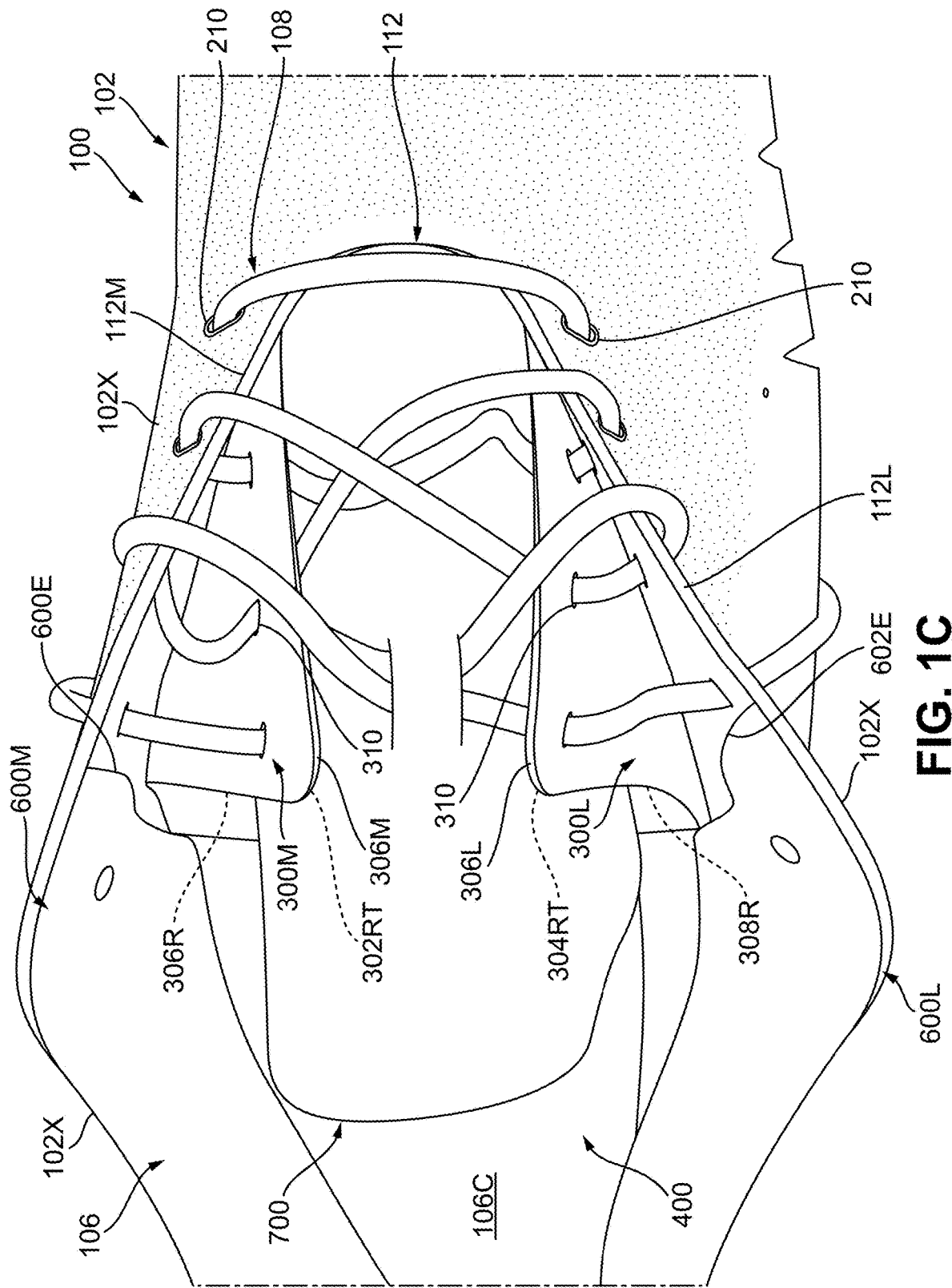

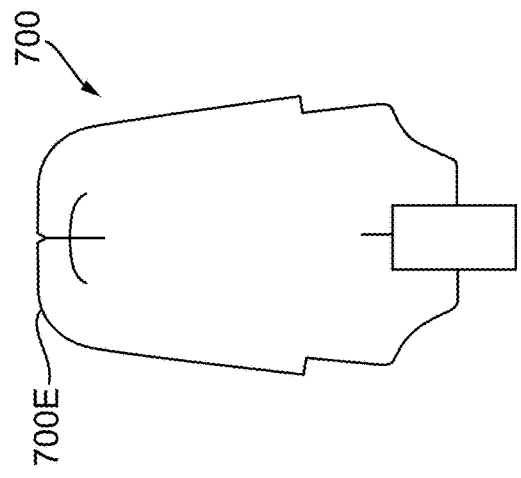
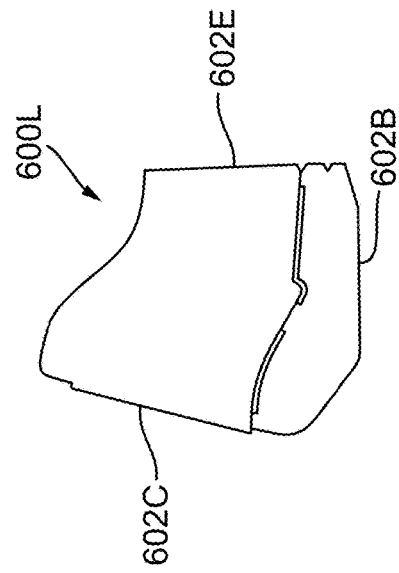
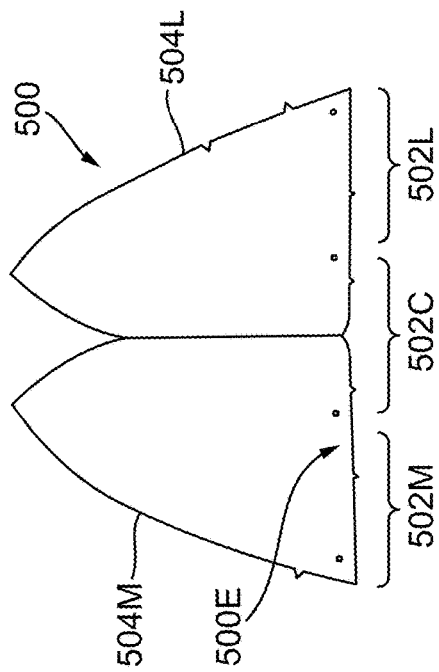

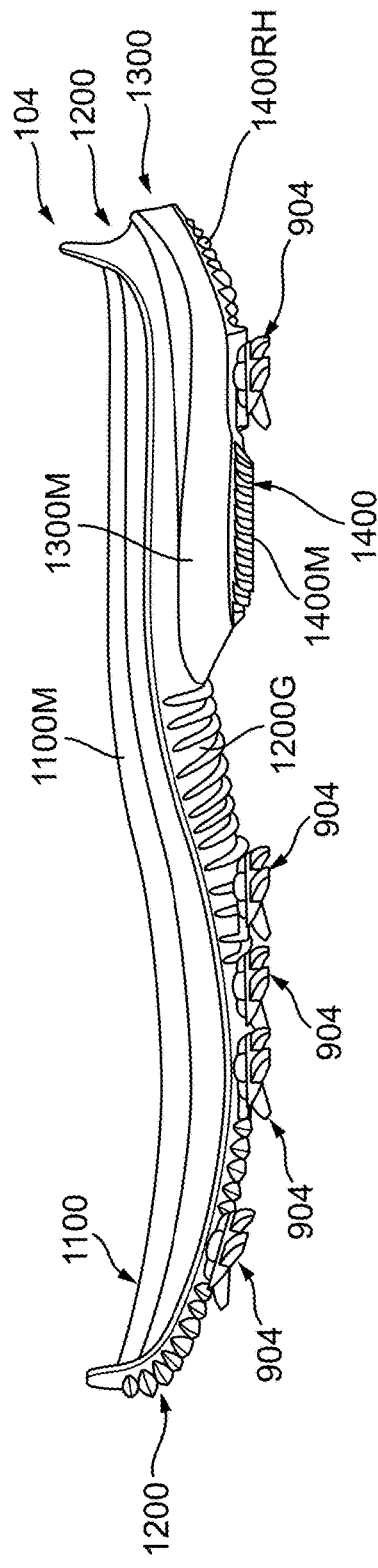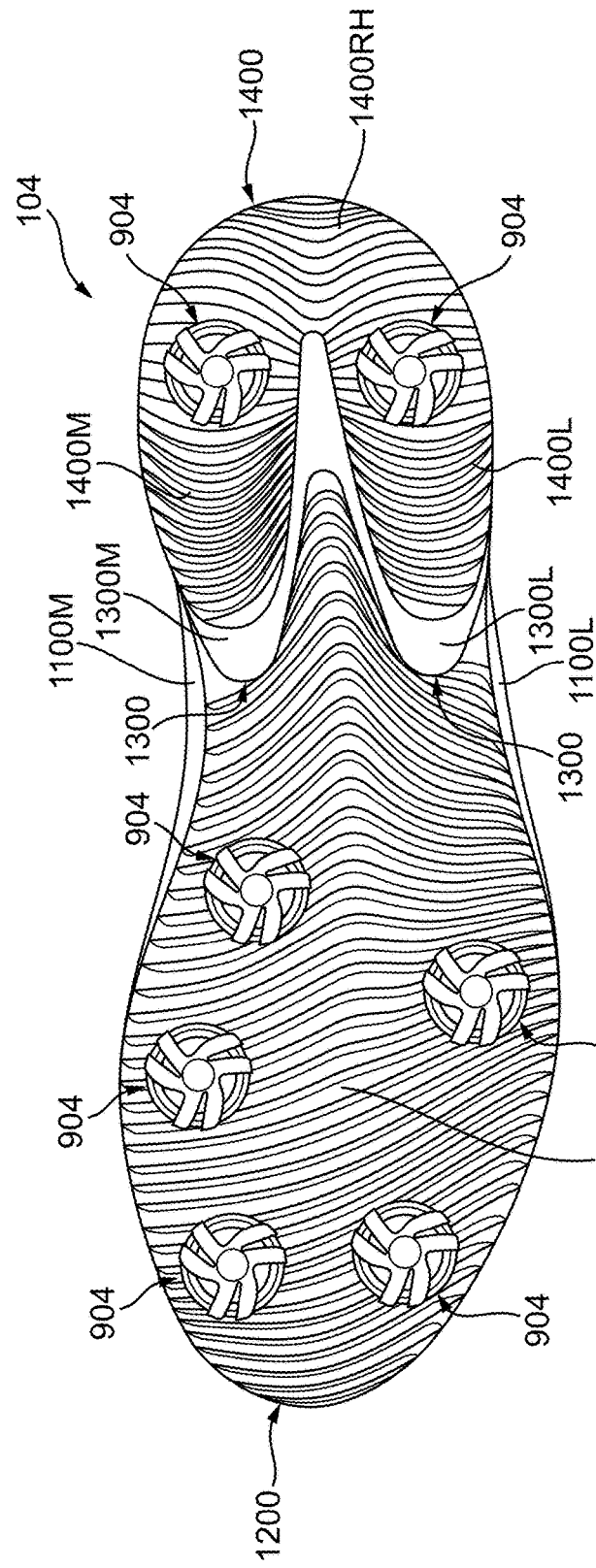
FIG. 9C
FIG. 9D

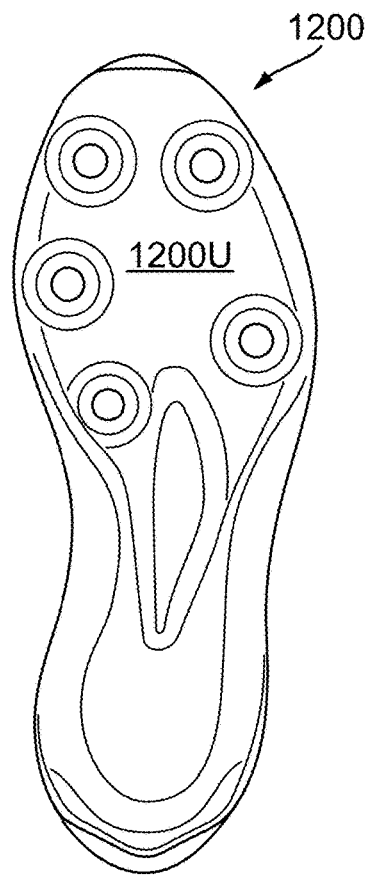
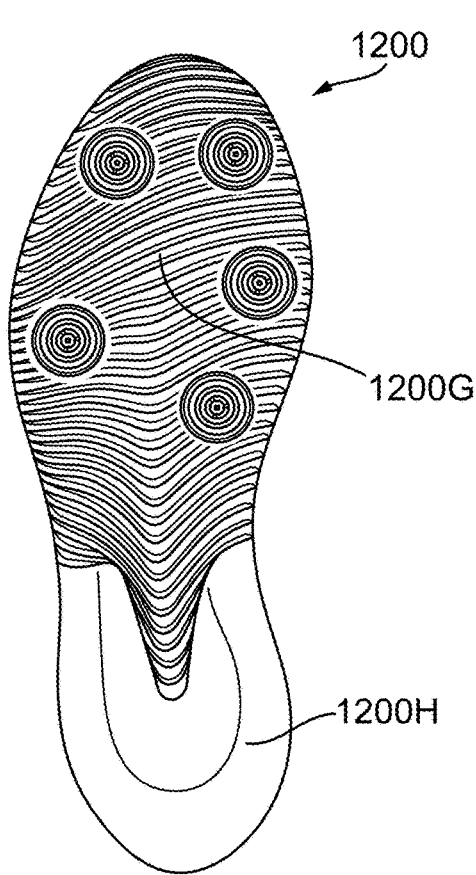
FIG. 12A  FIG. 12B
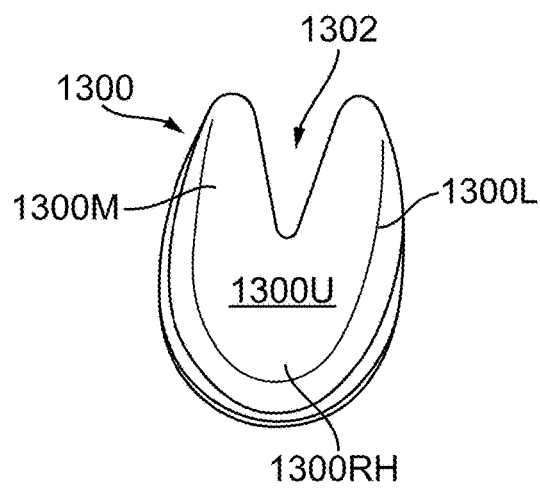
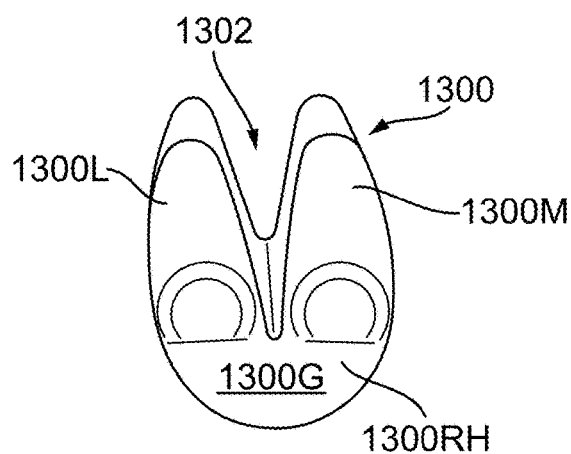
FIG. 13A  FIG. 13B

FOOTWEAR INCLUDING UPPERS WITH MIDFOOT AND/OR FOREFOOT SUPPORTING MEMBERS

RELATED APPLICATION DATA

This application claims priority benefits and is a U.S. Non-Provisional patent application based on U.S. Provisional Patent Appln. No. 63/502,232 entitled "Footwear Including Uppers With Midfoot and/or Forefoot Supporting Members" filed May 15, 2023, which application is entirely incorporated herein by reference.

FIELD OF THE INVENTION

The present technology relates to footwear uppers that include features for supporting a wearer's midfoot and/or forefoot region.

BACKGROUND

Conventional articles of athletic footwear include two primary elements, an upper and a sole structure. The upper may provide a covering for the foot that securely receives and positions the foot with respect to the sole structure. In addition, the upper may have a configuration that protects the foot and provides ventilation, thereby cooling the foot and removing perspiration. The sole structure may be secured to a lower surface of the upper and generally is positioned between the foot and any contact surface. In addition to attenuating ground reaction forces and absorbing energy, the sole structure may provide traction and control potentially harmful foot motion, such as over pronation.

The upper forms a void on the interior of the footwear for receiving the foot. The void has the general shape of the foot, and access to the void is provided at an ankle opening. Accordingly, the upper extends over the instep and toe areas of the foot, along the medial and lateral sides of the foot, and around the heel area of the foot. A lacing system often is incorporated into the upper to allow users to selectively change the size of the ankle opening and to permit the user to modify certain dimensions of the upper, particularly girth, to accommodate feet with varying proportions. In addition, the upper may include a tongue that extends under the lacing system to enhance the comfort of the footwear (e.g., to moderate pressure applied to the foot by the laces). The upper also may include a heel counter to limit or control movement of the heel.

SUMMARY

This Summary is provided to introduce some general concepts relating to this technology in a simplified form that are further described below in the Detailed Description. This Summary is not intended to identify key features or essential features of the invention.

Aspects of this technology relate to footwear uppers that include features for supporting a wearer's midfoot and/or forefoot regions. Portions of the footwear upper engage with the shoe lace to tighten around, contain, and support the wearer's midfoot and/or forefoot regions.

As some more specific examples, aspects of this technology relate to uppers for articles of footwear that include: (a) a first upper member formed from one or more component parts, the first upper member including at least one lace-engaging opening configured as an elongated through hole opening with a length dimension extending in a top-to-bottom direction of the upper and a width dimension extending in a heel-to-toe direction of the upper, wherein the length dimension is at least two times larger than the width dimension; (b) at least one midfoot supporting gusset located inside the first upper member, the midfoot supporting gusset(s) including at least one lace-engaging through hole; and (c) a lace extending through the at least one lace-engaging opening and the at least one lace-engaging through hole such that when the lace is in a tightened condition, the lace-engaging through hole(s) will at least partially align with a portion of the corresponding lace-engaging opening.

When only one lace-engaging opening and only one corresponding lace-engaging through hole are provided in an upper structure, they may be provided on either the lateral side or the medial side of the footwear upper. When multiple lace-engaging openings and corresponding lace-engaging through holes are provided in an upper structure: (i) all of the lace-engaging openings and all of the lace-engaging through holes may be provided on the lateral side, (ii) all of the lace-engaging openings and all of the lace-engaging through holes may be provided on the medial side, or (iii) one or more of the lace-engaging openings and one or more of the lace-engaging through holes may be provided on the lateral side and one or more of the lace-engaging openings and one or more of the lace-engaging through holes may be provided on the medial side.

Additional aspects of this technology relate to articles of footwear that include such uppers, methods of making such uppers and/or articles of footwear, and/or method of using such uppers and/or articles of footwear.

BRIEF DESCRIPTION OF THE DRAWINGS

The foregoing Summary, as well as the following Detailed Description, will be better understood when considered in conjunction with the accompanying drawings in which like reference numerals refer to the same or similar elements in all of the various views in which that reference number appears.

FIGS. 1A-1C provide various views of a footwear upper and article of footwear according to some aspects of this technology;

FIG. 5 illustrates a forefoot vamp upper component that may be used according to some aspects of this technology;

FIGS. 6A and 6B provide views of heel upper components that may be used according to some aspects of this technology;

FIG. 7 provides a view of a tongue component that may be used according to some aspects of this technology;

FIGS. 9A-9J provide various views of a sole structure that may be used in articles of footwear in accordance with some aspects of this technology;

FIGS. 12A and 12B illustrate an outsole component that may be included in sole structures and articles of footwear in accordance with some aspects of this technology;

FIGS. 13A and 13B illustrate a heel midsole component that may be included in sole structures and articles of footwear in accordance with some aspects of this technology.

DETAILED DESCRIPTION

Figure 1A:
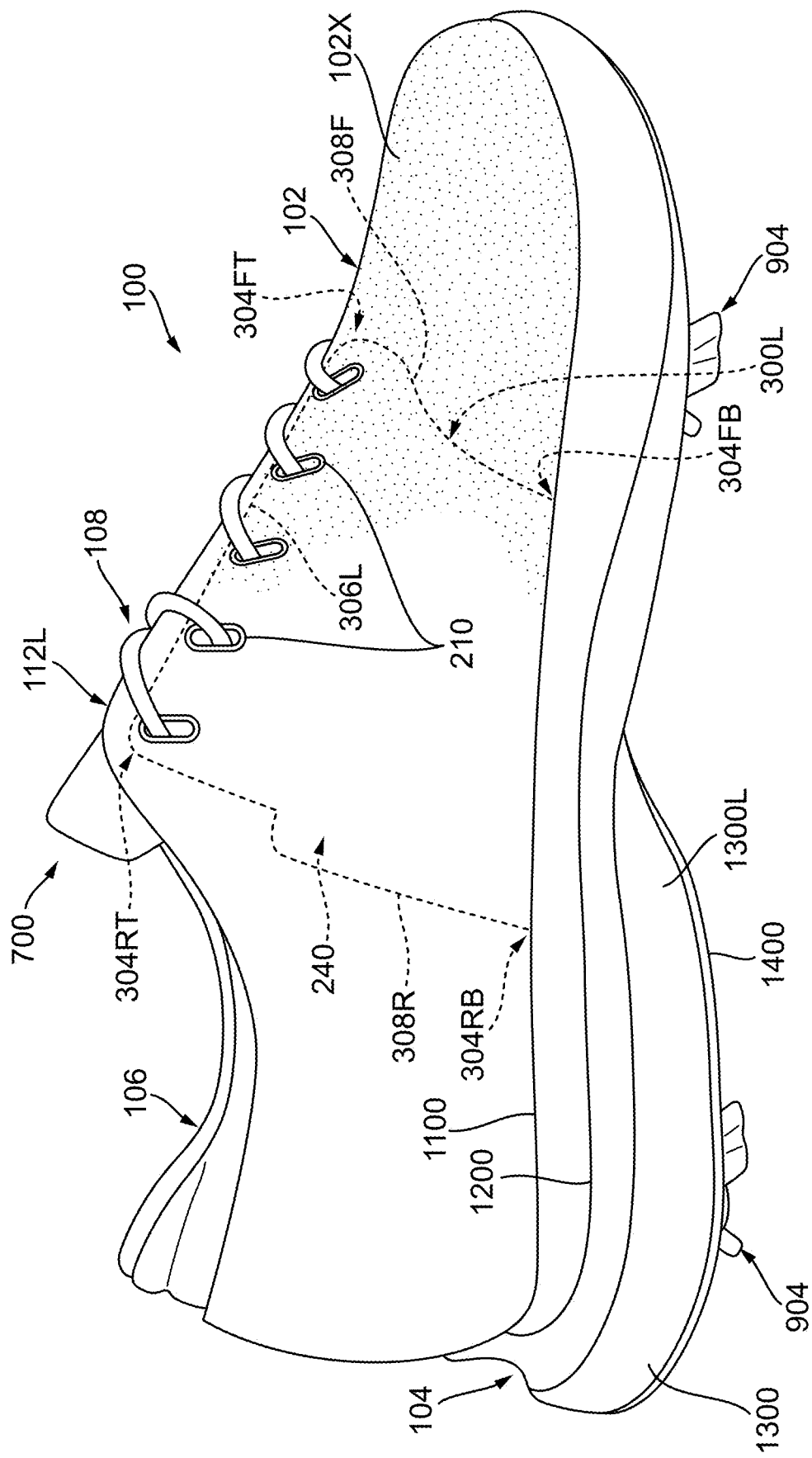

In the following description of various examples of footwear structures and components according to the present technology, reference is made to the accompanying drawings, which form a part hereof, and in which are shown by way of illustration various example structures and environments in which aspects of the present technology may be practiced. It is to be understood that other structures and environments may be utilized and that structural and functional modifications may be made to the specifically described structures and methods without departing from the scope of the present disclosure.

"Footwear," as that term is used herein, means any type of wearing apparel for the feet, and this term includes, but is not limited to: all types of shoes, boots, sneakers, sandals, thongs, flip-flops, mules, scuffs, slippers, sport-specific shoes (such as golf shoes, tennis shoes, baseball cleats, soccer or football cleats, ski boots, basketball shoes, cross training shoes, dance shoes, etc.), and the like.

Various structures and parameters of footwear uppers, sole structures, and/or articles of footwear are described herein based on a "longitudinal length" parameter L. Note FIG. 1B. The longitudinal length L can be found with the article of footwear 100 (or other component) oriented on a horizontal support surface on its ground-facing surface (e.g., on its sole structure 104) in an unloaded condition (e.g., with no weight applied to it other than weight of other components of the article of footwear 100). Once so oriented, parallel vertical planes VP that are perpendicular to the horizontal support surface are oriented to contact the rearmost heel (RH) location(s) and the forwardmost toe (FT) location(s) of the article of footwear 100 (or the upper 102, or the sole structure 104, or another component of interest). The parallel vertical planes VP should be oriented facing one another, e.g., extending into and out of the page of FIG. 1B, and as far away from one another as possible while still in contact with the rearmost heel RH and forwardmost toe FT locations. The direct distance between these vertical planes VPs corresponds to the longitudinal length L of the article of footwear 100 (or the upper 102, or the sole structure 104, or another component of interest). The locations of various footwear features and/or components are described in this specification based on their respective locations along the longitudinal length L as measured forward from the rear heel vertical plane VP. The rearmost heel location(s) is (are) located at position 0L and the forwardmost toe location(s) is (are) located at position 1L along the longitudinal length L. Intermediate locations along the longitudinal length L are referred to by fractional locations (e.g., 0.25L) along the longitudinal length L measured forward from the rear heel vertical plane VP. The term "parallel planes" as used herein are planes oriented parallel to the vertical planes VP. These parallel planes may intersect the longitudinal length L or longitudinal direction somewhere between P=0L and P=1.0L. Note FIG. 1B, including example parallel plane location designators at 0.33L, 0.46L, 0.54L, and 0.68L (discussed in more detail below).

The term "rearward" as used herein means at or toward the heel region of the article of footwear (or component thereof), and the term "forward" as used herein means at or toward a forefoot or forward toe region of the article of footwear (or component thereof). Unless otherwise defined, the terms "heel area" or "heel region" refer to a region bounded by parallel planes at 0L and 0.3L, the terms "midfoot area," "midfoot region," or "arch region" refer to a region bounded by parallel planes at 0.3L and 0.6L, and the terms "forefoot area" or "forefoot region" refer to a region bounded by parallel planes at 0.6L and 1.0L. Also, the term "lateral" means the "little toe" side or outside area of an article of footwear or component thereof (e.g., an upper, a sole structure, etc.), and the term "medial" means the "big toe" side or inside area of an article of footwear or component thereof (e.g., an upper, a sole structure, etc.).

The term "substantially round" as used herein means the shape is circular, round, rounded, oval, or elliptical. In at least some examples of this technology, shapes can be considered "substantially round" if a shortest diagonal DS and a longest diagonal DL passing through a geographic center of the shape are sized such that DL≥DS and DL≤1.25×DS.

Two values A and B are "substantially equal" to one another, as that term is used herein, if A=B or if the larger value is within 20% of the smaller value (i.e., if A<B, A and B are "substantially equal" if B≤1.2×A).

This application and/or its claims use the terms, e.g., "first," "second," "third," and the like, to identify certain components and/or features relating to this technology. These terms are used merely for convenience, e.g., to assist in maintaining a distinction between components and/or features of a specific structure. Use of these terms should not be construed as requiring a specific order or arrangement of the components and/or features being discussed. Also, use of these specific terms in the specification for a specific structure does not require that the same term be used in the claims to refer to the same structure (e.g., a component or feature referred to as the "third" in the specification may correspond to any numerical adjective used for that component or feature in the claims).

I. GENERAL DESCRIPTION OF ASPECTS OF THIS TECHNOLOGY

As noted above, aspects of this technology relate to footwear uppers and/or articles of footwear, e.g., of the types described and/or claimed below and/or of the types illustrated in the appended drawings. Such footwear uppers and/or articles of footwear may include any one or more structures, parts, features, properties, and/or combination(s) of structures, parts, features, and/or properties of the examples described and/or claimed below and/or of the examples illustrated in the appended drawings.

As some more specific examples, aspects of this technology relate to uppers for articles of footwear that include: (a) a first upper member formed from one or more component parts, the first upper member including a first lace-engaging opening having an elongated through hole opening with a length dimension extending in a top-to-bottom direction of the upper and a width dimension extending in a heel-to-toe direction of the upper, wherein the length dimension is at least two times larger than the width dimension; (b) a midfoot supporting gusset located inside the first upper member, the midfoot supporting gusset including a first lace-engaging through hole; and (c) a lace extending through the first lace-engaging opening and the first lace-engaging through hole such that when the lace is in a tightened condition, the first lace-engaging through hole at least partially aligns with a portion of the first lace-engaging opening.

Some aspects of this technology relate to uppers for articles of footwear that include: (a) a first upper member formed from one or more component parts (e.g., an exterior upper component or layer), the first upper member including: at least a first lateral lace-engaging opening and at least a first medial lace-engaging opening, wherein each of the first lateral lace-engaging opening and the first medial lace-engaging opening has an elongated through hole opening having a length dimension extending in a top-to-bottom direction of the upper and a width dimension extending in a heel-to-toe direction of the upper, and wherein the length dimension is at least two times larger than the width dimension; (b) a lateral gusset located inside the first upper member, the lateral gusset including at least a first lateral lace-engaging through hole; (c) a medial gusset located inside the first upper member, the medial gusset including at least a first medial lace-engaging through hole, wherein each of the first lateral lace-engaging through hole and the first medial lace-engaging through hole has a substantially round shape with a largest transverse dimension that is substantially equal to the width dimension; and (d) a lace extending through the lace-engaging openings and the lace-engaging through holes such that when the lace is in a tightened condition: (i) the first lateral lace-engaging through hole at least partially aligns with a portion of the first lateral lace-engaging opening, and (ii) the first medial lace-engaging through hole at least partially aligns with a portion of the first medial lace-engaging opening. The first upper member may include multiple lateral lace-engaging openings and/or multiple medial lace-engaging openings; the lateral gusset may include multiple lateral lace-engaging through holes (e.g., pairing up with corresponding lateral lace-engaging openings present); and/or the medial gusset may include multiple medial lace-engaging through holes (e.g., pairing up with corresponding medial lace-engaging openings present).

The lace-engaging opening(s) (i.e., the elongated through hole opening(s) in the first upper member) may have a top end and a bottom end (e.g., formed as an elongated slot extending in its length dimension). When the lace is pulled from a loosened condition into the tightened condition, the lace may move from an intermediate location along the lace-engaging opening(s) to the top end of the lace-engaging opening(s). This action will pull a top edge the midfoot supporting gusset(s) (e.g., the lateral gusset and/or the medial gusset) upward and/or inward, thereby securely containing and supporting the wearer's foot in the midfoot region.

Given the general description of features, aspects, structures, processes, and arrangements according to certain examples of this technology provided above, a more detailed description of specific example footwear uppers, articles of footwear, and methods in accordance with this technology follows.

II. DETAILED DESCRIPTION OF EXAMPLE FOOTWEAR UPPERS, ARTICLES OF FOOTWEAR, AND OTHER COMPONENTS/FEATURES ACCORDING TO THIS TECHNOLOGY

Referring to the figures and following discussion, various examples footwear uppers, sole structures, and/or articles of footwear in accordance with aspects of this technology are described.

FIGS. 1A-IC provide lateral side, medial side, and partial top views, respectively, of an article of footwear 100 in accordance with some aspects of this technology. The article of footwear 100 includes an upper 102 (e.g., made from one or more component parts) and a sole structure 104 (e.g., made from one or more component parts) engaged with the upper 102. This engagement may be accomplished in any desired manner using any desired engagement techniques (e.g., using one or more of adhesives, mechanical connectors, fasteners, sewn seams, etc.), including in conventional manners using engagement techniques as are known and used in the footwear arts. The upper 102 defines a foot-receiving opening 106 that provides access to an interior chamber 106C (see FIG. 1C) sized and shaped to receive a wearer's foot. A lace 108 is provided to secure the article of footwear 100 to the wearer's foot. A tongue component 700 underlies the lace 108, e.g., to moderate the feel of the lace 108 against the wearer's foot when the lace 108 is in a tightened condition and secured to a wearer's foot. These parts will be described in more detail below.

The upper 102 may be made from any desired materials, including upper materials conventionally known and used in the footwear arts (e.g., leathers (natural or synthetic), fabrics, thermoplastic polyurethanes, etc.). While FIGS. 1A and 1B (and other figures herein) show specific aesthetic appearances and ornamental features for the upper 102, the aesthetic appearances and ornamental features shown herein are simply examples. A wide variety of different aesthetic appearances and/or ornamental designs may be provided for the upper 102, including many different appearances and designs at the exterior-most layer 102X of the upper 102 (also called an "exterior layer" or "exterior upper component" herein). Similarly, while FIGS. 1A and 1B (and other figures herein) show specific aesthetic appearances and ornamental features for the sole structure 104, the aesthetic appearances and ornamental features shown herein are simply examples. A wide variety of different aesthetic appearances and/or ornamental designs may be provided for the sole structure 104.

Figure 1B:
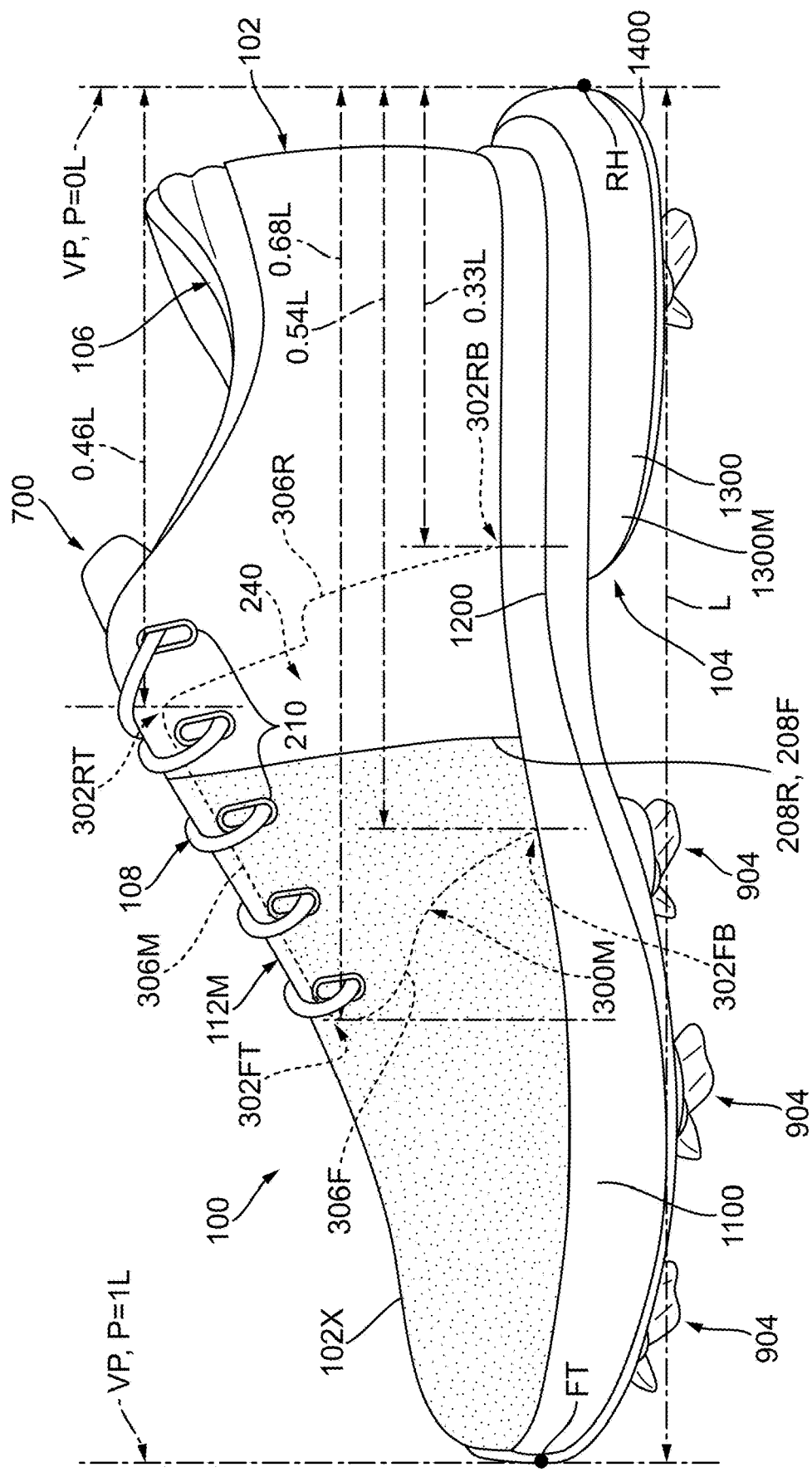

FIGS. 1A and 1B show in broken lines a general outline of a lateral midfoot supporting gusset 300L (FIG. 1A) and a medial midfoot supporting gusset 300M (FIG. 1B) that are located inside an exterior-most layer 102X of the upper 102, as shown in FIG. 1C. The exterior-most layer 102X of the upper 102 may be made from one or more component parts (as will be discussed in more detail below), such as from a leather material, optionally a leather material including small perforations. As shown in FIGS. 1A and 1C, the lateral midfoot supporting gusset 300L extends from: (a) a location adjacent a lateral edge 112L of an instep opening 112 of the upper 102 to (b) the bottom lateral edge 220E of the upper 102 (e.g., where the upper 102 meets the sole structure 104—see also FIGS. 2A-2E). Similarly, as shown in FIGS. 1B and 1C, the medial midfoot supporting gusset 300M extends from: (a) a location adjacent a medial edge 112M of the instep opening 112 of the upper 102 to (b) the bottom medial edge 220E of the upper 102 (e.g., where the upper 102 meets the sole structure 104—see also FIGS. 2A-2E).

FIG. 1B illustrates the location of various parts of a medial midfoot supporting gusset 300M in terms of the longitudinal length L of the article of footwear 100. As some more specific examples:

A rearmost bottom edge of the medial midfoot supporting gusset 300M or a rearward location where the medial midfoot supporting gusset 300M meets the sole structure 104 or joins to the strobel 400 (e.g., point 302RB in FIG. 1B) may be located within a range of 0.2L to 0.4L (where L is the longitudinal length of the article of footwear 100 or the upper 102)—FIG. 1B shows point 302RB of this specific example located at about 0.33L; and/or A rearmost top edge of the medial midfoot supporting gusset 300M (e.g., point 302RT in FIGS. 1B and 1C) may be located within a range of 0.35L to 0.55L (where L is the longitudinal length of the article of footwear 100 or the upper 102)—FIG. 1B shows point 302RT of this specific example located at about 0.46L; and/or A forwardmost bottom edge of the medial midfoot supporting gusset 300M or a forward location where the medial midfoot supporting gusset 300M meets the sole structure 104 or joins to the strobel 400 (e.g., point 302FB in FIG. 1B) may be located within a range of 0.45L to 0.75L (where L is the longitudinal length of the article of footwear 100 or the upper 102)—FIG. 1B shows point 302FB of this specific example located at about 0.54L; and/or A forwardmost top edge of the medial midfoot supporting gusset 300M (e.g., point 302FT in FIG. 1B) may be located within a range of 0.55L to 0.8L (where L is the longitudinal length of the article of footwear 100 or the upper 102)—FIG. 1B shows point 302FT of this specific example located at about 0.68L.

In this manner, at least 50% of a surface area of the medial midfoot supporting gusset 300M may be located in a medial midfoot region of the footwear upper 102 and/or article of footwear 100 (and in some examples, at least 60%, at least 75%, at least 80%, at least 90%, at least 95%, or even 100% of the surface area of the medial midfoot supporting gusset 300M may be located in a medial midfoot region of the footwear upper 102 and/or article of footwear 100).

Similarly, various parts of a lateral midfoot supporting gusset 300L in terms of the longitudinal length L of the upper 102 and/or article of footwear 100 include:

A rearmost bottom edge of the lateral midfoot supporting gusset 300L or a rearward location where the lateral midfoot supporting gusset 300L meets the sole structure 104 or joins to the strobel 400 (e.g., point 304RB in FIG. 1A) may be located within a range of 0.2L to 0.4L (where L is the longitudinal length of the article of footwear 100 or the upper 102); and/or A rearmost top edge of the lateral midfoot supporting gusset 300L (e.g., point 304RT in FIGS. 1A and 1C) may be located within a range of 0.35L to 0.55L (where L is the longitudinal length of the article of footwear 100 or the upper 102); and/or A forwardmost bottom edge of the lateral midfoot supporting gusset 300L or a forward location where the lateral midfoot supporting gusset 300L meets the sole structure 104 or joins to the strobel 400 (e.g., point 304FB in FIG. 1A) may be located within a range of 0.45L to 0.75L (where L is the longitudinal length of the article of footwear 100 or the upper 102); and/or A forwardmost top edge of the lateral midfoot supporting gusset 300L (e.g., point 304FT in FIG. 1A) may be located within a range of 0.55L to 0.8L (where L is the longitudinal length of the article of footwear 100 or the upper 102).

In this manner, at least 50% of a surface area of the lateral midfoot supporting gusset 300L may be located in a lateral midfoot region of the footwear upper 102 and/or article of footwear 100 (and in some examples, at least 60%, at least 75%, at least 80%, at least 90%, at least 95%, or even 100% of the surface area of the lateral midfoot supporting gusset 300L may be located in a lateral midfoot region of the footwear upper 102 and/or article of footwear 100).

Figure 2A:
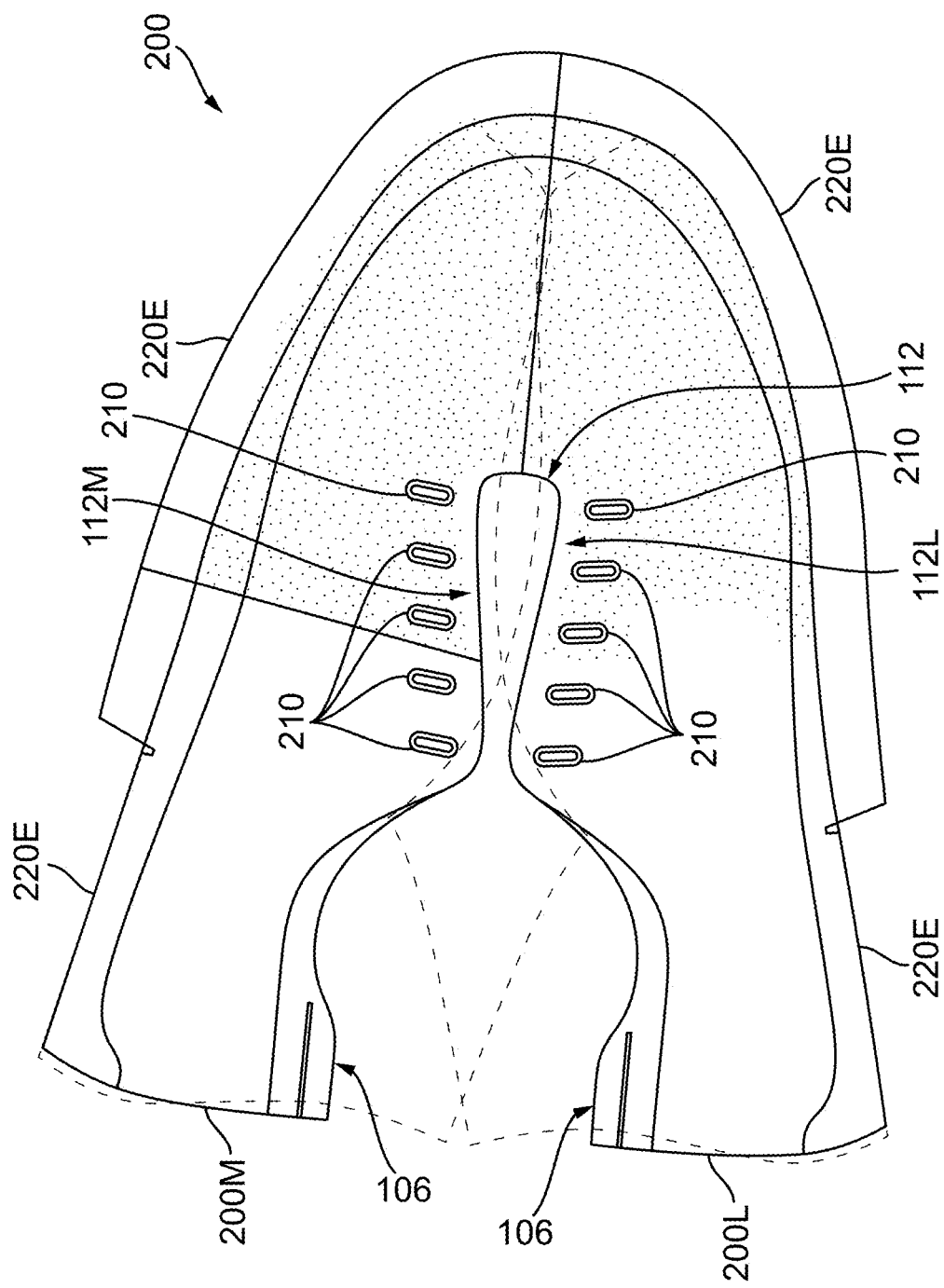
FIGS. 2A-2E provide views of various examples of upper blank components that may be used according to some aspects of this technology.

Additional features and aspects of uppers 102 in accordance with at least some examples of this technology will be described in more detail in conjunction with FIGS. 2A-2E. Where the same reference numbers are used in FIGS. 2A-2E as used in FIGS. 1A-1C discussed above, the same or similar parts are being referenced (including any of the variations, options, or alternatives for that part discussed above), and the description of that part with respect to one figure may be applied to the other figures in which that part appears. FIG. 2A shows an upper blank component 200 (e.g., which may form an exterior layer 102X of an upper 102) formed as a single part (e.g., from a leather material or other desired material(s)). The medial rear edge 200M of this upper blank component 200 may be fixed with the lateral rear edge 200L (e.g., by sewn seams, by adhesives, by fusing techniques, etc.) to form the final upper 102 (or an exterior layer 102X of the final upper 102).

Figure 2B:
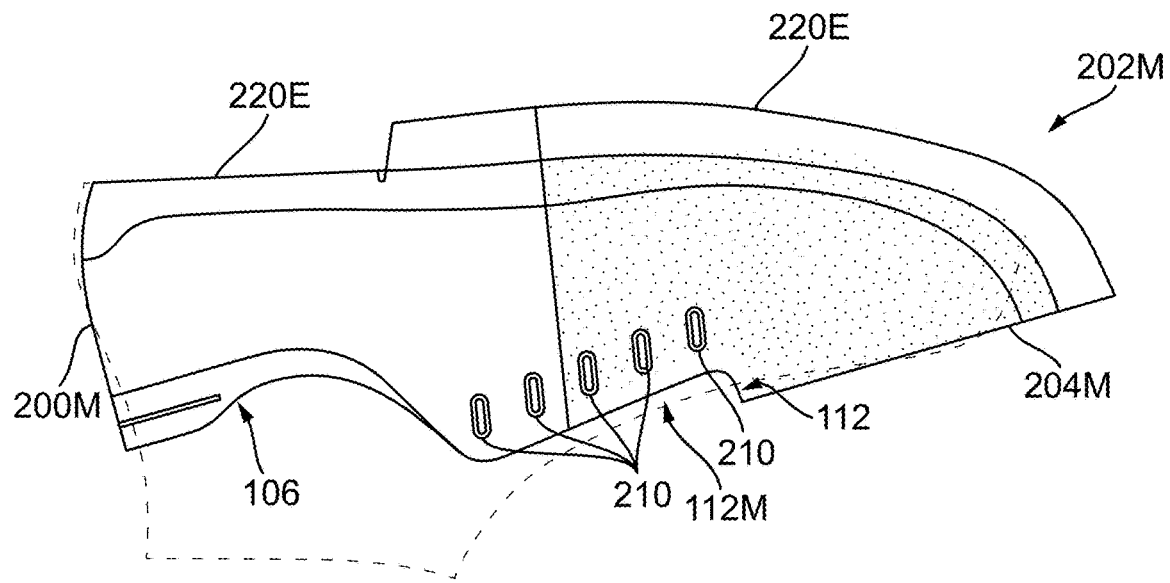
Figure 2C:
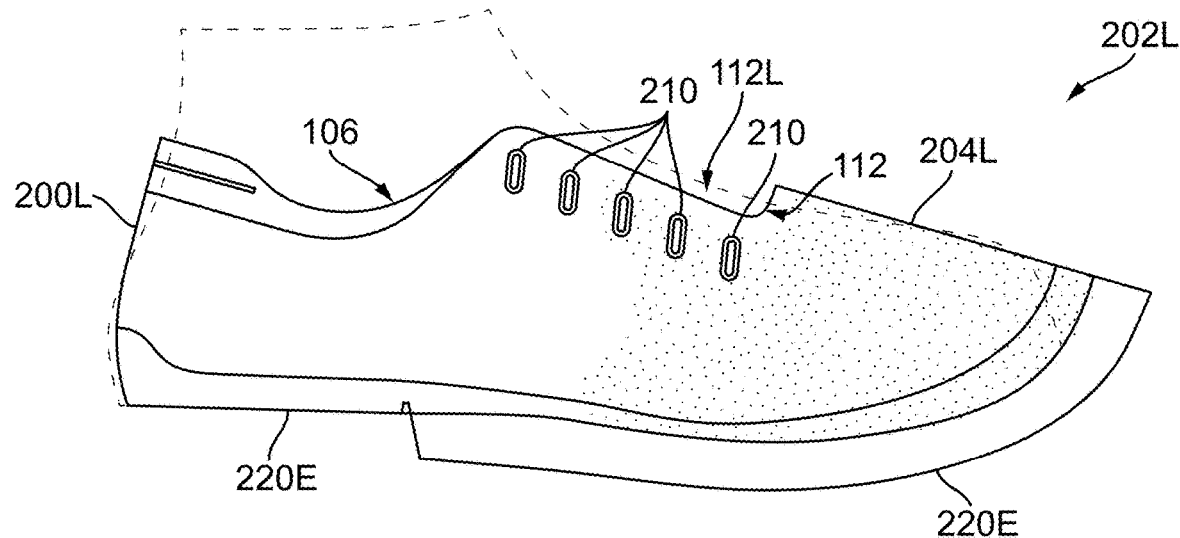

FIGS. 2B and 2C show a two part upper component formed from a medial upper member 202M (FIG. 2B) and a lateral upper member 202L (FIG. 2C). These two upper members 202M and 202L may be fixed together to form an exterior layer 102X of an upper 102 and may be formed from any desired material(s) (e.g., from a leather material). These two upper members 202M and 202L may be fixed together along a medial instep edge 204M and a lateral instep edge 204L (e.g., by sewn seams, by adhesives, by fusing techniques, etc.), e.g., to form a structure like that shown in FIG. 2A. The medial rear edge 200M of the medial upper member 202M of FIG. 2B may be fixed with the lateral rear edge 200L of the lateral upper member 202L (e.g., by sewn seams, by adhesives, by fusing techniques, etc.) to form the final upper 102 (or an exterior layer 102X of the final upper 102).

Figure 2D:
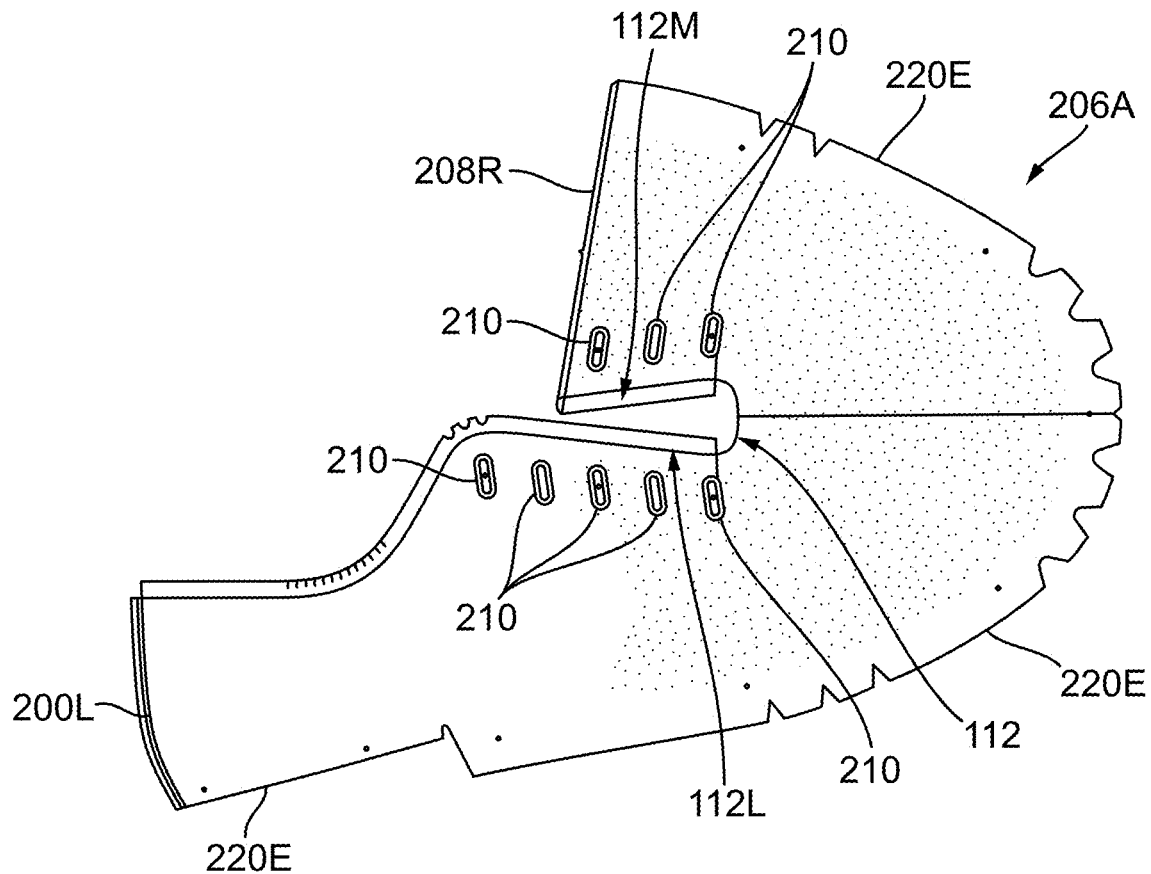
Figure 2E:
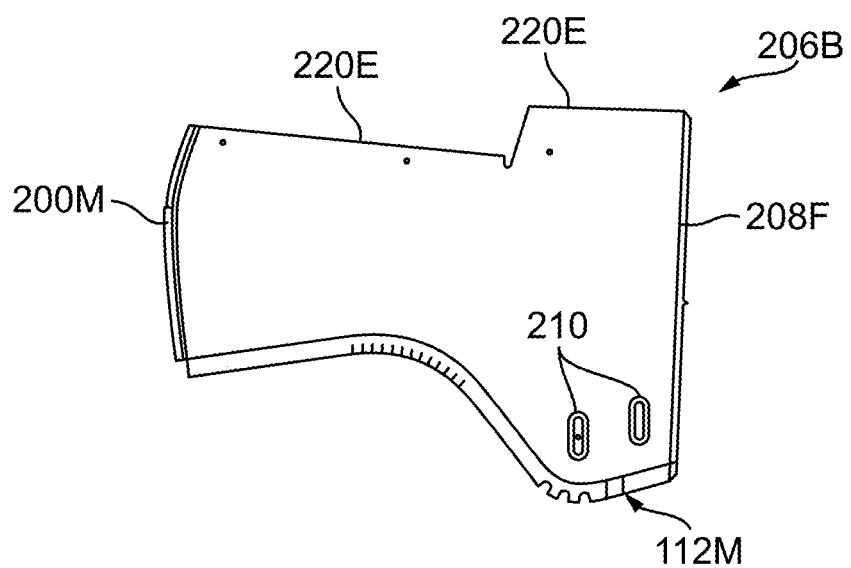

FIGS. 2D and 2E show another two part upper component. In this example: (i) one upper component 206A forms a first side, the front (instep), and a midfoot/forefoot portion of a second side of the upper (e.g., a lateral side, front, and medial midfoot/forefoot side component 206A shown in FIG. 2D), and (ii) another upper component 206B forms the heel/midfoot portion of the second side of the upper (e.g., a medial heel/midfoot component 206B). Thus, as shown in FIGS. 2D and 2E, upper component 206A includes the entire lateral edge 112L and a forward portion of the medial edge 112M of the instep opening 112, while upper component 206B of this example includes a rearward portion of the medial edge 112M of the instep opening 112.

The two upper components 206A and 206B of FIGS. 2D and 2E may be fixed together to form an exterior layer 102X of an upper 102 and may be formed from any desired material(s) (e.g., from a leather material). These two upper components 206A and 206B may be fixed together along a medial midfoot forward edge 208F and a medial midfoot rearward edge 208R (e.g., by sewn seams, by adhesives, by fusing techniques, etc.), e.g., to form a structure like that shown in FIG. 2A. The medial rear edge 200M (on medial heel/midfoot component 206B in this example) of FIG. 2E may be fixed with the lateral rear edge 200L (on the lateral side, front, and medial midfoot/forefoot side component 206A in this example) of FIG. 2D (e.g., by sewn seams, by adhesives, by fusing techniques, etc.) to form the final upper 102 (or an exterior layer 102X of the final upper 102). The specific upper 102 shown in FIGS. 1A-IC has a two part construction of the type shown in FIGS. 2D and 2E.

Alternatively, the structures shown in FIGS. 2D and 2E could be flip-flopped so that: (a) the upper component 206A of FIG. 2D forms a medial side, front, and lateral midfoot/forefoot side component and (b) the upper component 206B of FIG. 2E forms a lateral heel/midfoot component. The seam formed between edges 208R and 208F may be provided at any desired location along the longitudinal length L of the second side of the upper (e.g., somewhere between parallel planes located at 0.1L and 0.8L). Other variations in the sizes, shapes, and/or number of upper components (e.g., for an exterior layer 102X of the final upper 102) may be provided in different examples of this technology.

FIGS. 2A-2E further show that these example upper members 200, 202M, 202L, 206A, and 206B (e.g., the upper component(s) forming the exterior layer 102X of the final upper 102 structure) include one or more lace-engaging openings 210. The lace-engaging openings 210 in these examples are through hole openings that extend completely through the exterior layer 102X of the final upper structure, i.e., through hole openings that extend completely through upper members 200, 202M, 202L, 206A, and/or 206B. A medial set of lace-engaging openings 210 are provided on the medial side of the upper 102 near the medial edge 112M of the instep opening 112 and are spaced from one another along the medial edge 112M in the front-to-rear direction of the upper 102. A lateral set of lace-engaging openings 210 are provided on the lateral side of the upper 102 near the lateral edge 112L of the instep opening 112 and are spaced from one another along the lateral edge 112L in the front-to-rear direction of the upper 102. As will be described in more detail below in conjunction with FIGS. 8A and 8B, one or more of the lace-engaging openings 210 (e.g., one or more on each side of the instep opening 112, up to all of the lace-engaging openings 210) of the exterior layer 102X of the final upper 102 structure will constitute an elongated through hole opening of the types shown. These elongated through hole opening(s) may be oriented to have its (their) length dimension LO extending in a top-to-bottom direction of the upper 102 and its (their) width dimension W extending in a heel-to-toe direction of the upper 102. Note also FIGS. 1A, 1B, 8A, and 8B. In at least some examples of this technology, the length dimension LO may be at least 2 times larger than the width dimension W, and in some examples, at least 2.25 times larger, at least 2.5 times larger, at least 2.75 times larger, at least 3 times larger, or even at least 3.5 times larger.

The interior surface of the upper members 200, 202M, 202L, 206A, and/or 206B may include a reinforcing layer 240 with elongated through hole openings corresponding to (aligning with) locations of the elongated lace-engaging openings 210 shown in FIGS. 2A-2E. That reinforcing layer 240 may correspond in size and shape to the locations of the broken lines shown in FIGS. 1A and 1B (and optionally may correspond in size, shape, and/or location to the position of the medial midfoot supporting gusset 300M and the lateral midfoot supporting gusset 300L discussed in more detail below). The reinforcing layer 240, when present, may be fixed to the interior surface of the exterior layer 102X of the upper 102, e.g., by an adhesive, and may help prevent undesired tearing of the lace-engaging openings 210. The reinforcing layer 240 may be formed from any desired material, such as fabric material, a TPU material, leather, etc.

Figure 3A:
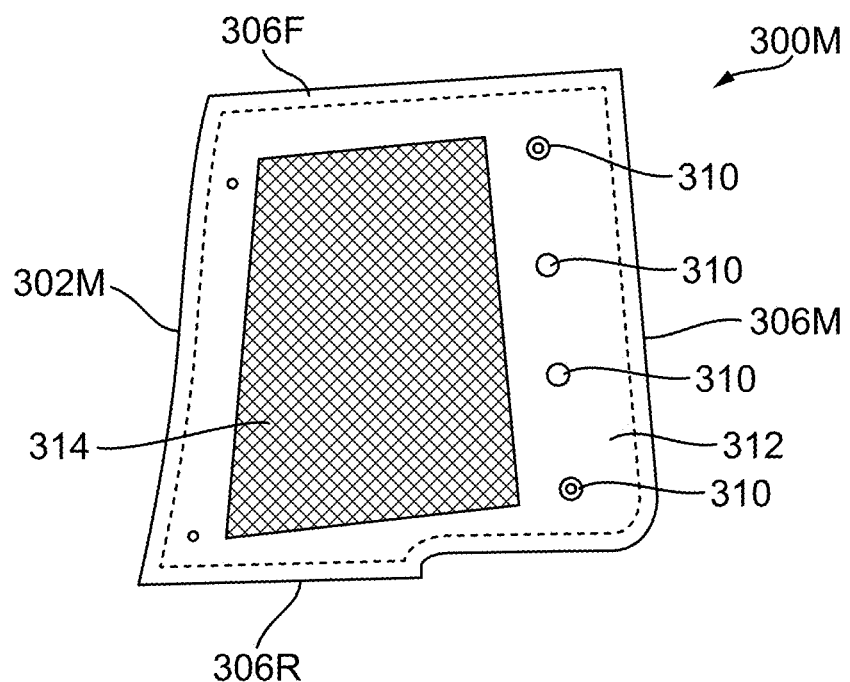
FIGS. 3A and 3B provide views of midfoot supporting gussets that may be used according to some aspects of this technology.
Figure 3B:
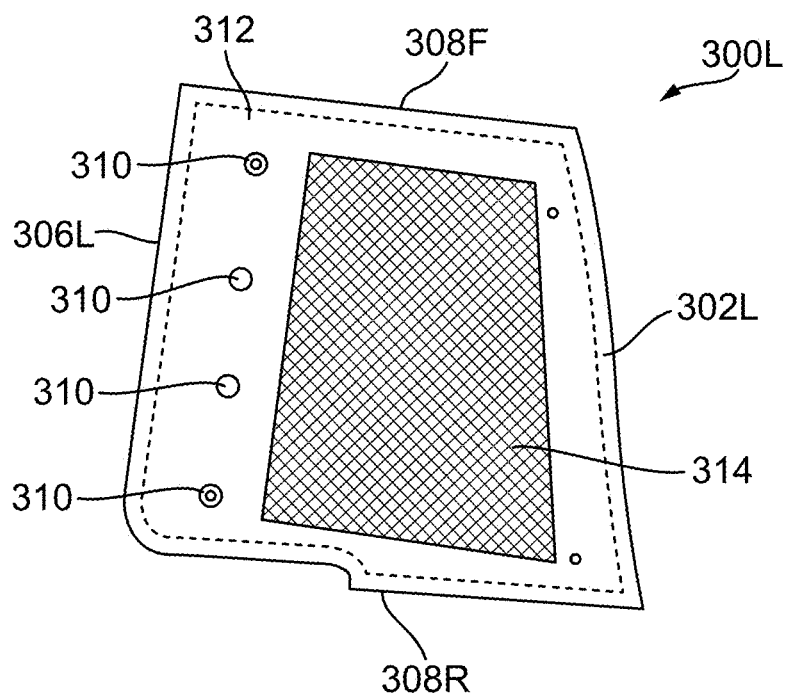

As discussed above in conjunction with FIGS. 1A-1C, this example upper 102 structure further includes a lateral midfoot supporting gusset 300L and a medial midfoot supporting gusset 300M, each located inside the exterior-most layer 102X of the upper 102. In fact, in some examples, the lateral midfoot supporting gusset 300L and the medial midfoot supporting gusset 300M form part of the interior-most layer of the upper 102 (e.g., with interior surfaces directly exposed to and/or in contact with the wearer's foot). FIGS. 3A and 3B further illustrate these gussets 300L and 300M. Where the same reference numbers are used in FIGS. 3A-3B as used in FIGS. 1A-1C discussed above, the same or similar parts are being referenced (including any of the variations, options, or alternatives for that part discussed above), and the description of that part with respect to one figure may be applied to the other figures in which that part appears. FIG. 3A provides a view of one example medial midfoot supporting gusset 300M and FIG. 3B provides a view of one example lateral midfoot supporting gusset 300L. The bottom edge 302M of the medial midfoot supporting gusset 300M engages a bottom of the upper 102 (e.g., a strobel 400, a fluid-filled bladder 420, a bottom panel, exterior layer 102X, etc.), e.g., and this bottom edge 302M may extend from points 302RB and 302FB shown in FIG. 1B. The bottom edge 302L of the lateral midfoot supporting gusset 300L engages a bottom of the upper 102 (e.g., a strobel 400, a fluid-filled bladder 420, a bottom panel, exterior layer 102X, etc.), e.g., and this bottom edge 302L may extend from points 304RB and 304FB shown in FIG. 1A. The top edge 306M of the medial midfoot supporting gusset 300M extends along and/or near the medial edge 112M of the instep opening 112, e.g., and this top edge 306M extends from points 302RT and 302FT shown in FIG. 1B. The top edge 306L of the lateral midfoot supporting gusset 300L extends along and/or near the lateral edge 112L of the instep opening 112, e.g., and this top edge 306L extends from points 304RT and 304FT shown in FIG. 1A. Further, as shown in FIGS. 3A and 3B, the medial midfoot supporting gusset 300M includes a rearward edge 306R and a forward edge 306F, and the lateral midfoot supporting gusset 300L includes a rearward edge 308R and a forward edge 308F. Lateral midfoot supporting gusset 300L and medial midfoot supporting gusset 300M may be made from any desired materials, such as fabrics or textiles (optionally stretch resistant materials). As some more specific examples, the lateral midfoot supporting gusset 300L and/or the medial midfoot supporting gusset 300M may be made from multiple layers, e.g., with an outer layer providing stretch resistance and/or reinforcement and an inner layer (nearer to the wearer's foot) providing a softer and/or comfort-enhancing contact surface.

As further shown in FIGS. 3A and 3B, each of the medial midfoot supporting gusset 300M and the lateral midfoot supporting gusset 300L includes one or more lace-engaging through holes 310. Each of the illustrated example medial midfoot supporting gusset 300M and lateral midfoot supporting gusset 300L includes four lace-engaging through holes 310 extending along its top edge 306M, 306L, respectively. The lace-engaging through holes 310 in this example extend completely through the materials forming the medial midfoot supporting gusset 300M and the lateral midfoot supporting gusset 300L. A medial set of lace-engaging through holes 310 are provided near the top edge 306M and are arranged to be spaced from one another along the top edge 306M in the front-to-rear direction of the upper 102. A lateral set of lace-engaging through holes 310 are provided near the top edge 306L and are arranged to be spaced from one another along the top edge 306L in the front-to-rear direction of the upper 102. The lace-engaging through holes 310 may be oriented (e.g., positioned and spaced) such that one or more of the lace-engaging through holes 310 (and optionally each lace-engaging through hole 310) is able to partially align with a corresponding one of the lace-engaging openings 210 of the exterior layer 102X of the upper 102 (as will be described in more detail below in conjunction with FIGS. 8A and 8B).

In at least some examples of this technology, one or more of the lace-engaging through holes 310 may be formed in a substantially round shape. As some more specific examples, one or more of the lace-engaging through holes 310 may be formed to have a largest transverse dimension (e.g., a diameter dimension D, a diagonal dimension) that is substantially equal to the width dimension W of the corresponding lace-engaging opening 210 with which that lace-engaging through hole 310 will be paired (as will be described below). Note also FIGS. 8A and 8B.

FIGS. 3A and 3B further illustrate that the medial midfoot supporting gusset 300M and the lateral midfoot supporting gusset 300L of this illustrated example include a multi-part construction. Specifically, each of the medial midfoot supporting gusset 300M and the lateral midfoot supporting gusset 300L includes: (a) an outer component 312 (e.g., forming the outer edge or perimeter of the gusset 300L, 300M, including its front, rear, top, and bottom perimeter edges) and (b) an inner component 314. The outer component 312 may be more durable, e.g., acting as a reinforcing component to prevent tearing at the lace-engaging through holes 310 and/or may provide a stable surface to support a sewn seam (e.g., when sewn to other upper 102 components, such as the strobel 400, the forefoot vamp component 500, the medial heel component 600M, the lateral heel component 600L, etc.). The inner component 314 may be more breathable, optionally a mesh material, that is sewn to or otherwise engaged with the outer component 312. Either or both of the outer component 312 and/or the inner component 314 may be a stretch resistant fabric or polymeric component (such as a TPU), e.g., to enable a conforming fit when tightened and/or to enable tight engagement with and support of the foot.

As further evident from FIGS. 3A and 3B, the medial midfoot supporting gusset 300M of this example extends continuously and provides a continuous surface from the rearward edge 306R to the forward edge 306F and from the top edge 306M (proximate the lace-engaging through holes 310 and the instep region) to the bottom edge 302M (proximate the strobel 400). Similarly, the lateral midfoot supporting gusset 300L of this example extends continuously and provides a continuous surface from the rearward edge 308R to the forward edge 308F and from the top edge 306L (proximate the lace-engaging through holes 310 and the instep region) to the bottom edge 302L (proximate the strobel 400). Thus, each of the medial midfoot supporting gusset 300M and the lateral midfoot supporting gusset 300L of this example extends continuously within or through the midfoot region of the article of footwear 100 and/or from the instep opening to the sole structure 104.

FIGS. 4A through 7 provide various views of additional footwear upper components that may be included in footwear 100 and upper 102 structures in accordance with at least some examples of this technology. Where the same reference numbers are used in FIGS. 4A-7 as used in FIGS. 1A-1C, the same or similar parts are being referenced and the description of that part with respect to one figure may be applied to the other figures in which that part appears. FIGS. 4A-4D provide various views of components forming a footbed of an upper 102 in accordance with some examples of this technology. FIG. 5 provides a view of a forefoot vamp component 500 that may be included in footwear uppers 102 in accordance with some examples of this technology. FIGS. 6A and 6B provide views of a medial heel component 600M and a lateral heel component 600L, respectively, that may be included in footwear uppers 102 in accordance with some examples of this technology. FIG. 7 illustrates a tongue component 700 that may be included in footwear uppers 102 in accordance with some examples of this technology.

Figure 4A:
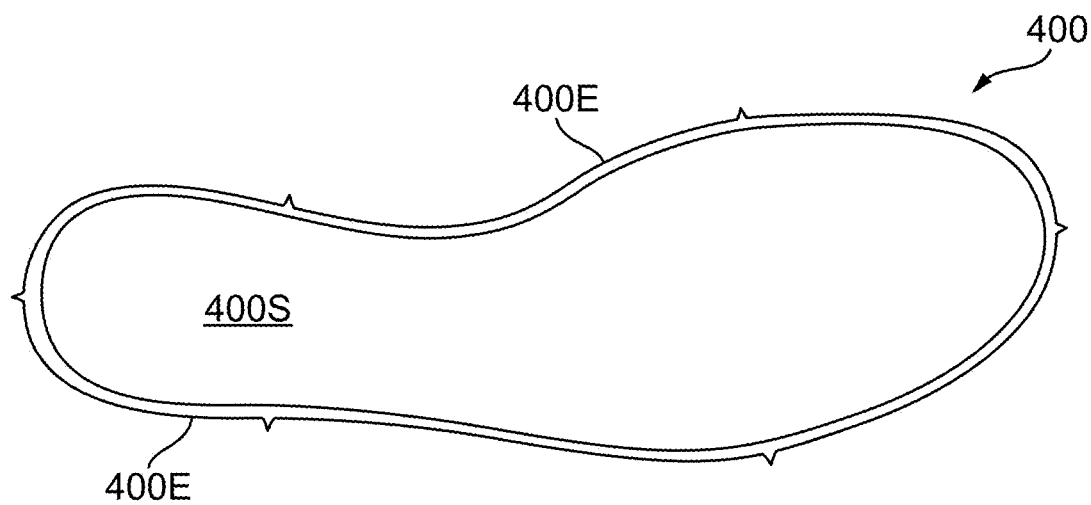
FIGS. 4A-4D provide various views of a strobel member, an insole or sock liner member, and their incorporation into an upper and an article of footwear according to some aspects of this technology.

FIG. 4A shows a top view of a strobel 400 that may be included in footwear uppers 102 in accordance with some examples of this technology. The strobel 400 includes a foot-supporting surface 400S that extends to support all (or substantially all) of a plantar surface of a wearer's foot. The strobel 400 may be made from a heavy or stiff fabric component and/or other materials as are conventionally known and used in the footwear arts. The edge 400E of the strobel 400 may engage the bottom edge(s) 220E of the upper components 200, 202M, 202L, 206A, and/or 206B, depending on the upper construction used (and/or other upper component parts), e.g., by stitching, by adhesives, etc. Additionally, the edge 400E of the strobel 400 may engage the bottom edge 302L of the lateral midfoot supporting gusset 300L (FIG. 3B) and the bottom edge 302M of the medial midfoot supporting gusset 300M (FIG. 3A).

Figure 4B:
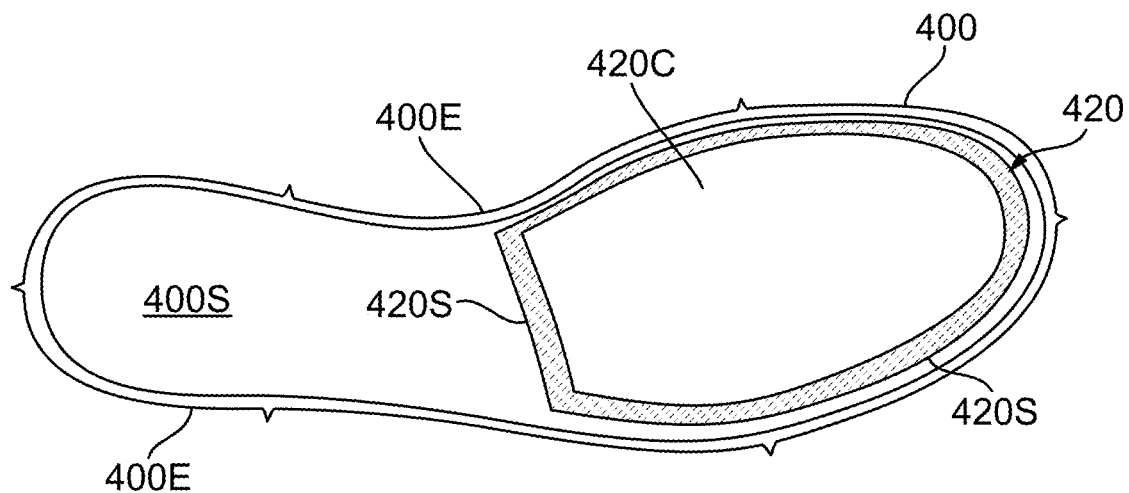
Figure 4D:
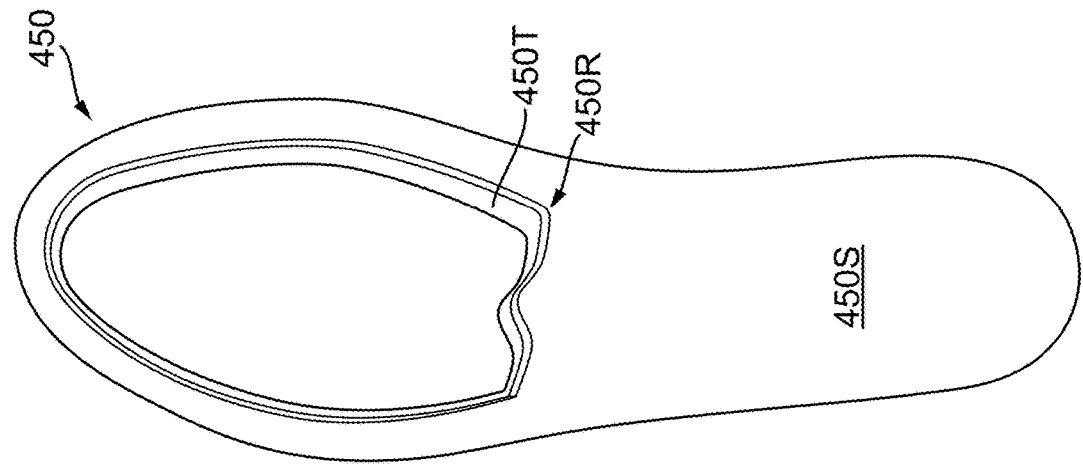
Figure 4C:
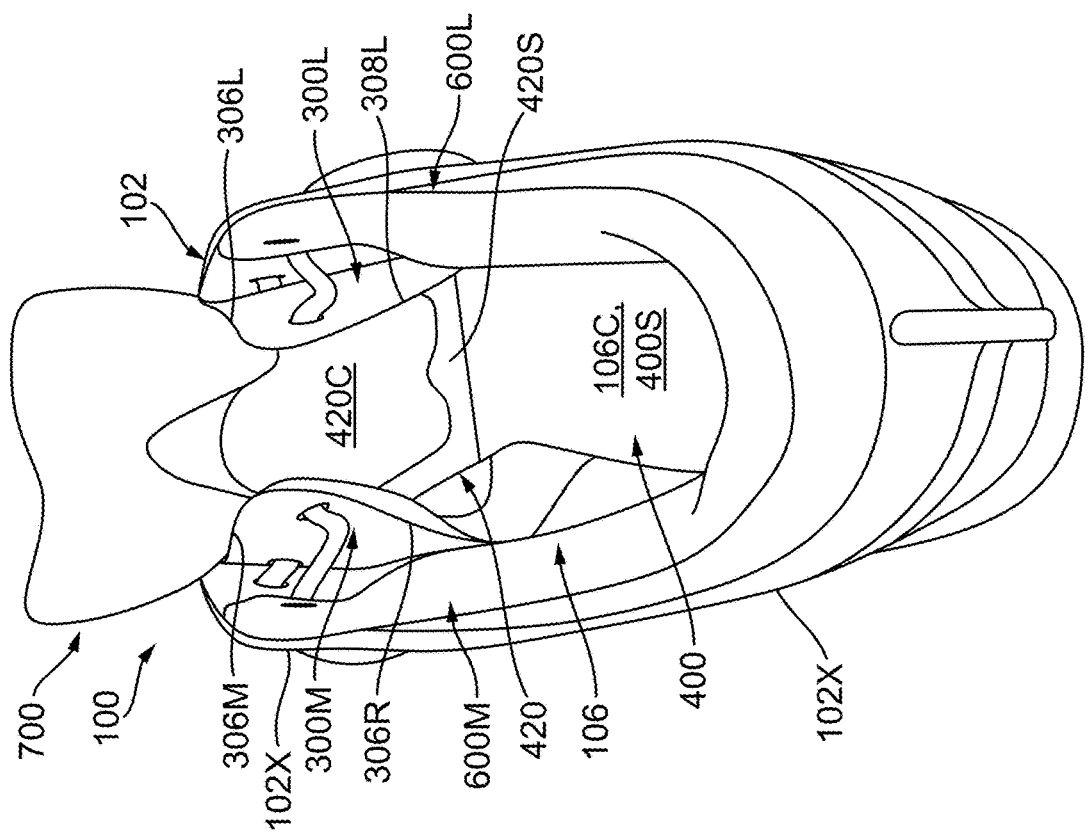

In at least some examples of this technology, as shown in FIGS. 4B and 4C, a fluid-filled bladder 420 may be provided on the foot-supporting surface 400S of the strobel 400. While the fluid-filled bladder 420 may be provided to cover any desired portion and/or proportion of the foot-supporting surface 400S, in this illustrated example, the fluid-filled bladder 420 is provided primarily in the forefoot region of the foot-supporting surface 400S and extends rearward into the midfoot region of the foot-support surface 400S. The fluid-filled bladder 420 may be engaged with the strobel 400 in any desired manner, such as by adhesives, by stitching (e.g., through the fluid-filled bladder 420's seam area 420S which is shaded with dashed hatching in FIG. 4B), by mechanical fasteners, etc. The fluid-containing chamber 420C of the fluid-filled bladder 420 may have a thin structure (e.g., less than 12 mm thick or even less than 10 mm or 8 mm thick) and may be made from conventional materials (thermoplastic elastomeric materials) and/or conventional constructions as are known and used in the footwear art. The fluid-filled bladder 420 helps provide responsiveness and enhance support under the wearer's foot.

FIG. 4D provides a bottom view of a sock liner 450 or insole member that may be used in footwear 100 structures in accordance with at least some examples of this technology. The bottom surface 450S of this sock liner 450 includes a recess 450R sized and shaped to receive the fluid-filled bladder 420 (e.g., at least the inflated fluid-containing chamber 420C portion thereof). The recess 450R may constitute a through hole, although FIG. 4D shows the recess 450R as a blind-hole with a closed top surface 450T. For assembly, the sock liner 450 may be inserted into the interior chamber 106C of the upper 102 in the arrangement shown in FIG. 4C such that the recess 450R overlies and receives the top of fluid-containing chamber 420C of the fluid-filled bladder 420. The sock liner 450 may be made from conventional materials (e.g., one or more of a foam material, a fabric material, etc.), and it may be fixed or unfixed within the interior chamber 106C of the upper 102.

FIG. 5 illustrates a forefoot vamp component 500 (e.g., a lining or other forefoot vamp interior upper component) that may be included in footwear 100 and/or upper 102 structures in accordance with some examples of this technology. This forefoot vamp component 500 includes a rearward edge 500E. This example rearward edge 500E includes: (i) a medial side portion 502M that may be engaged with (e.g., sewn to) the forward edge 306F of the medial midfoot supporting gusset 300M (see FIG. 3A); (ii) a lateral side portion 502L that may be engaged with (e.g., sewn to) the forward edge 308F of the lateral midfoot supporting gusset 300L (see FIG. 3B); and (iii) a central portion 502C that may be engaged with an exterior vamp upper component (such as the area of exterior layer 102X of the upper 102 just forward of the forward edge of the instep opening 112). Additionally, this example forefoot vamp component 500 includes a medial bottom edge 504M that engages (e.g., is sewn to): (a) the edge 400E on the medial side of the strobel 400 and/or (b) the bottom edge(s) 220E on the medial side of one or more upper members (e.g., one or more of 200, 202M, 202L, and/or 206A, depending on the upper construction used). Similarly, this example forefoot vamp component 500 includes a lateral bottom edge 504L that engages (e.g., is sewn to): (a) the edge 400E on the lateral side of the strobel 400 and/or (b) the bottom edge(s) 220E on the lateral side of one or more upper members (e.g., one or more of 200, 202M, 202L, and/or 206A, depending on the upper construction used).

If desired, the forefoot vamp component 500 may be made from multiple layers, e.g., with an outer layer providing strength and/or reinforcement and an inner layer (nearer to the wearer's foot) providing a comfort-enhancing contact surface (e.g., a softer fabric component). Additionally or alternatively, in the final upper 102 construction, the bottom edge of the forefoot vamp component 500 (e.g., combined edges 504M and 504L of the example in FIG. 5) will extend continuously from the forward edge 308F of the lateral midfoot supporting gusset 300L to the forward edge 306F of the medial midfoot supporting gusset 300M around a forward toe region of the upper 102.

FIGS. 6A and 6B illustrate a medial heel component 600M (a lining or other medial heel interior upper component) and a lateral heel component 600L (a lining or other lateral heel interior upper component), respectively, that may be included in footwear 100 and/or upper 102 structures in accordance with some examples of this technology. The medial heel component 600M includes: (i) a forward edge 600E that engages (e.g., is sewn to) a rearward edge 306R of the medial midfoot supporting gusset 300M, (ii) a bottom edge 600B that engages (e.g., is sewn to) the edge 400E on the medial side of the strobel 400 and/or the bottom edge(s) 220E on the medial side of one or more upper members (e.g., one or more of 200, 202M, and/or 206B, depending on the upper construction used), and (iii) a rear central edge 600C. Similarly, the lateral heel component 600L includes: (i) a forward edge 602E that engages (e.g., is sewn to) a rearward edge 308R of the lateral midfoot supporting gusset 300L, (ii) a bottom edge 602B that engages (e.g., is sewn to) the edge 400E on the lateral side of the strobel 400 and/or the bottom edge(s) 220E on the lateral side of one or more upper members (e.g., one or more of 200, 202L, and/or 206A, depending on the upper construction used), and (iii) a rear central edge 602C. The rear central edges 600C and 602C of the medial heel component 600M and the lateral heel component 600L, respectively, may be engaged together (e.g., sewn together) at a rear central heel area of the upper 102.

If desired, the medial heel component 600M and/or the lateral heel component 600L may be made from multiple layers, e.g., with an outer layer providing strength and/or reinforcement and an inner layer (nearer to the wearer's foot) providing a comfort-enhancing contact surface (e.g., a softer fabric component). The medial heel component 600M and/or the lateral heel component 600L also may include a foam member, e.g., particularly around the top collar portion, to provide a comfortable contact surface for engaging the wearer's foot (e.g., at the ankle area). Additionally or alternatively, in the final upper 102 construction, the bottom edges of the heel components 600M and 600L (e.g., combined edges 600B and 602B of the example of FIGS. 6A and 6B) will extend continuously from the rearward edge 308R of the lateral midfoot supporting gusset 300L to the rearward edge 306R of the medial midfoot supporting gusset 300M around a rear heel region of the upper 102.

While other upper 102 constructions are possible, in this illustrated example, the medial midfoot supporting gusset 300M, the lateral midfoot supporting gusset 300L, the strobel 400 (optionally including fluid-filled bladder 420), the forefoot vamp component 500, the medial heel component 600M, and the lateral heel component 600L may combine to form a "bootie" like interior upper element that contains much of the wearer's foot. These attached components may fit within and engage an exterior upper component 102X, e.g., which may include parts of the types shown in FIGS. 2A-2E (e.g., one or more of 200, 202M, 202L, 206A, and/or 206B, depending on the upper construction used).

FIG. 7 illustrates an example tongue component 700 that also may be included in uppers 102 in accordance with some examples of this technology. The tongue component 700 underlies the lace 108, e.g. to moderate the feel of the lace 108 against the wearer's foot when the lace 108 is in a tightened condition and secured to a wearer's foot. In this illustrated example, the forward edge 700E of the tongue component 700 may be engaged with (e.g., sewn to) the rearward edge 500E of the forefoot vamp component 500 (e.g., at one or more of the central portion 502C, the medial side portion 502M, and/or the lateral side portion 502L). Additionally or alternatively, the forward edge 700E of the tongue component 700 may be engaged with (e.g., sewn to) one or more of: (i) the exterior upper component 102X (e.g., adjacent the forward edge of instep opening 112 of upper components 200, 202M, 202L, and/or 206A, depending on the upper construction used); (ii) the forward edge 306F of the medial midfoot supporting gusset 300M; and/or (iii) the forward edge 308F of the lateral midfoot supporting gusset 300L.

Figure 8A:
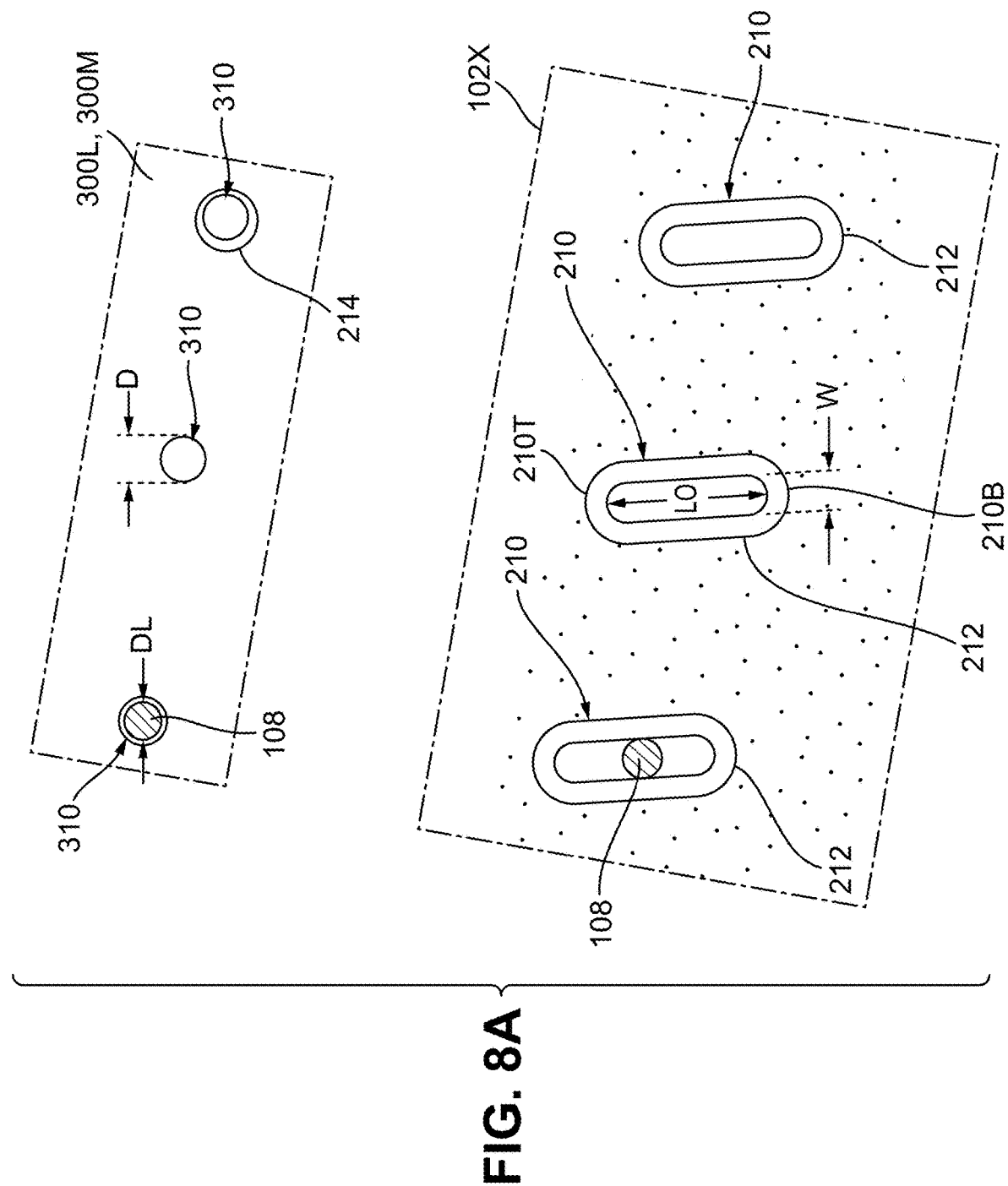
FIGS. 8A and 8B illustrate features of securing upper components in accordance with some aspects of this technology into a tightened condition.
Figure 8B:
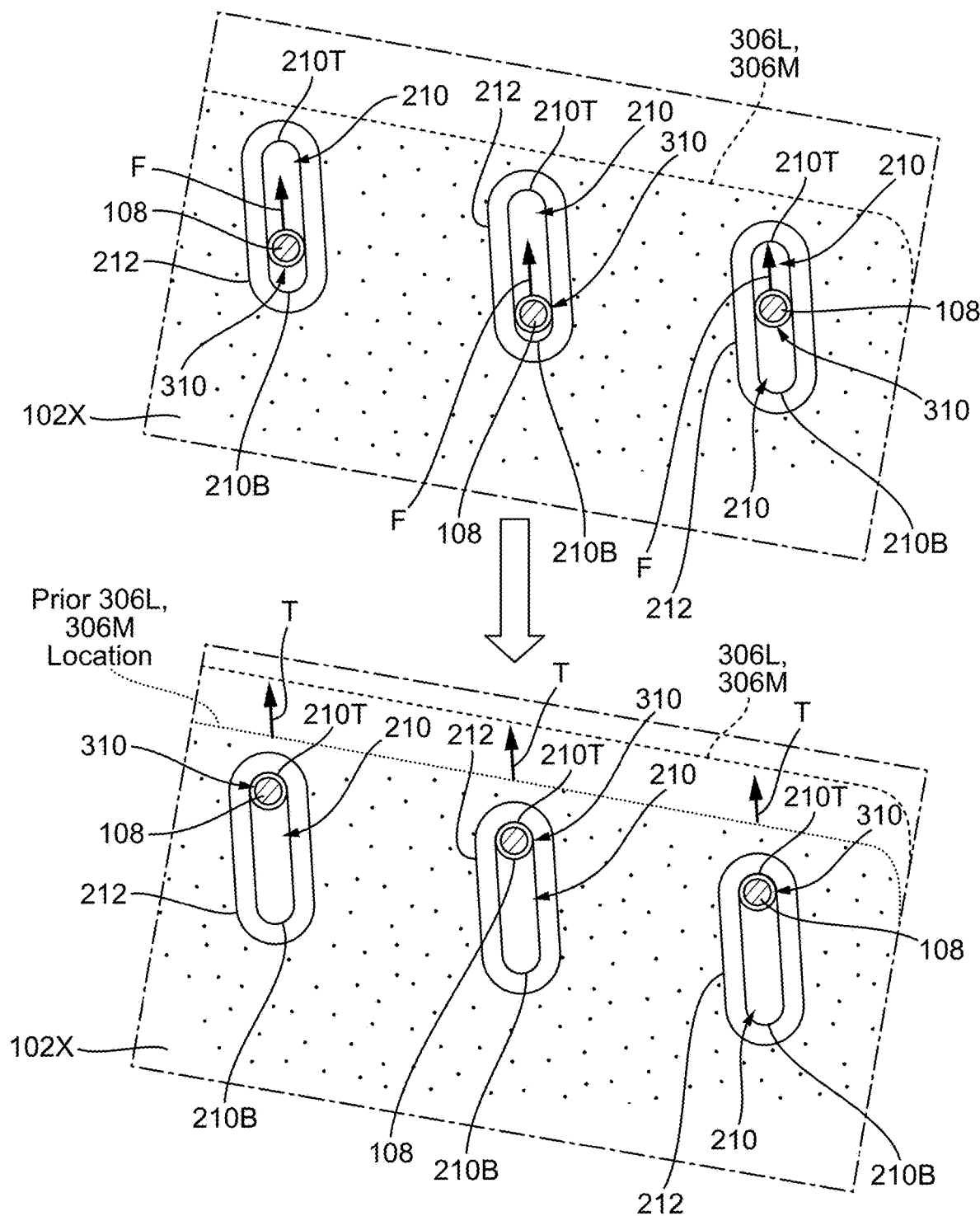

FIGS. 8A and 8B show additional details of one or more of the lace-engaging openings 210 (an elongated through hole) of an exterior upper component 102X and one or more of the lace-engaging through holes 310 of a medial or lateral midfoot supporting gusset 300M, 300L and their use in accordance with at least some examples of this technology. Only portions of the exterior upper component 102X and the medial or lateral midfoot supporting gusset 300M, 300L are shown in FIGS. 8A and 8B (e.g., these components may extend beyond the dot-dash lines shown in FIGS. 8A and 8B). As shown in FIG. 8A, the elongated through hole openings forming the lace-engaging openings 210 have a length dimension LO (which may extend in a top-to-bottom direction of the upper 102) and a width dimension W (which may extend in a heel-to-toe direction of the upper 102). The length dimension LO extends directly from a top end 210T of the lace-engaging opening 210 to a bottom end 210B of the lace-engaging opening 210. The width dimension W extends directly across the lace-engaging opening 210, e.g., in a direction perpendicular to the length dimension LO. In at least some examples of this technology, the length dimension LO may be at least 2 times larger than the width dimension W, and in some examples, at least 2.25 times larger, at least 2.5 times larger, at least 2.75 times larger, at least 3 times larger, or even at least 3.5 times larger. As further shown in FIG. 8A, if desired, one or more of the lace-engaging openings 210 may have a reinforcing element 212 formed around it (e.g., metal, plastic, etc.) to prevent undesired stretching or deformation of the openings 210. Additionally or alternatively, if desired, one or more of the lace-engaging through holes 310 may have a reinforcing element 214 formed around it (e.g., metal, plastic, etc.) to prevent undesired stretching or deformation of the through holes 310.

As also shown in FIG. 8A, one or more of the lace-engaging through holes 310 may be formed in a substantially round shape. As some more specific examples, one or more of the lace-engaging through holes 310 may be formed to have a largest transverse dimension (e.g., a diameter dimension D, a diagonal dimension, etc.) that is substantially equal to the width dimension W of the corresponding lace-engaging opening 210 with which that lace-engaging through hole 310 will be paired. As some more examples, the lace-engaging through hole 310 may have a diameter D (or largest transverse dimension D) that is: (i) equal to the width W, (ii) within a range of $0.8W \le D \le 1.2W$, and/or (iii) within a range of $0.9W \le D \le 1.1W$.

FIG. 8A further shows a lace 108 aligned with one of the lace-engaging through holes 310 of the medial or lateral midfoot supporting gusset 300M, 300L. In some examples of this technology, the lace 108 will be substantially unstretchable (e.g., stretching less than 5% of its longitudinal length when an axial force is applied). Further, in at least some examples of this technology, at least a portion of the lace 108 (e.g., at least a portion of the lace 108 that engages the lace-engaging through holes 310 of the medial and/or lateral midfoot supporting gussets 300M, 300L) may have a transverse cross-sectional size and shape (e.g., diameter or largest diagonal dimension DL) that substantially matches a size and shape of the lace-engaging through hole(s) 310 through which it will extend. Thus, in this illustrated example, the lace 108 has a substantially round transverse cross sectional shape that substantially matches the shape of the lace-engaging through holes 310. A lace 108 will "substantially match" the size and shape of a lace-engaging through hole 310 if: (a) the outer surface of the lace 108 contacts the entire perimeter of the lace-engaging through hole 310 (e.g., if the lace 108 completely fills the lace-engaging through hole 310 when the lace 108 extends through the lace-engaging through hole 310), (b) the lace 108 diameter or diagonal dimension DL is equal to the through hole 310 diameter or diagonal dimension D, and/or (c) DL is within a range of $0.8D \le DL \le 1.2D$. In some examples, DL may be within a range of $0.9D \le DL \le 1.1D$. In some examples of this technology, the lace 108 will relatively tightly fit within the lace-engaging through hole(s) 310 (while still being capable of moving with respect to the lace-engaging through hole(s) 310 when pulled with sufficient force).

FIG. 8B illustrates changes in relative positioning between the lace 108, lace-engaging through hole(s) 310, and lace-engaging openings 210 as the lace 108 changes from a loosened condition (the top of FIG. 8B) to a tightened condition (the bottom of FIG. 8B). As evident, for example, from FIGS. 1A-1C and 4C, in the final footwear 100 and upper 102 constructions, the medial midfoot supporting gusset 300M and lateral midfoot supporting gusset 300L are positioned inside the exterior layer 102X of the upper 102 (at the midfoot region) and the lace 108 is engaged with the upper 102 such that the lace 108 axially extends through adjacent pairs of the lace-engaging through holes 310 and lace-engaging openings 210. In a loosened condition (e.g., as shown in FIGS. 1C and 4C), the lace 108 and through hole openings 310 of the midfoot supporting gussets 300L, 300M may be positioned any place along the longitudinal length dimension LO of the lace-engaging openings 210 of the upper component (e.g., exterior layer 102X). See the top of FIG. 8B. When the lace 108 is tightened, a pulling force F is applied to the lace 108 to move the lace 108 toward (and optionally to) the top end(s) 210T of the lace-engaging opening(s) 210. The lace 108 may abut the top end 210T of one or more of the lace-engaging openings 210 when in the tightened condition. See the bottom of FIG. 8B. Because the lace 108 is sized and shaped to "substantially match" the size and shape of the lace-engaging through hole(s) 310, this tightening action also pulls the top edges 306L, 306M of the medial and lateral midfoot supporting gussets 300M, 300L upward and inward, as shown by force arrows T in FIG. 8B. These steps further tighten the medial midfoot supporting gusset 300M and lateral midfoot supporting gusset 300L around the wearer's foot to provide added midfoot support and stability. As shown in FIG. 1C, at least a portion (e.g., an upper portion located toward the instep opening area) of the rearward edges 306R and 308R of the medial and lateral midfoot supporting gussets 300M, 300L, respectively, may remain unfixed to other footwear components in the final footwear structure to facilitate the above-noted action and/or to help wrap the wearer's midfoot. Similarly, if desired, at least a portion (e.g., an upper portion located toward the instep opening area) of the forward edges 306F and 308F of the medial and lateral midfoot supporting gussets 300M, 300L, respectively, may remain unfixed to other footwear components in the final footwear structure, e.g., to facilitate the above-noted action and/or to help wrap the wearer's midfoot.

The tightening action also causes the lace-engaging through hole(s) 310 to at least partially align with portions of the corresponding lateral lace-engaging openings 210 and/or medial lace-engaging openings 210. As shown in the view of FIG. 8B (at the bottom), the lace-engaging through hole(s) 310 may be at least partially visible through its corresponding lace-engaging opening 210.

As shown in FIGS. 1A and 1B, articles of footwear 100 in accordance with examples of this technology include a sole structure 104 engaged with the upper 102. Any desired type of sole structure 104 for any desired activity may be provided on uppers 102 of the types described above. In this illustrated example, the sole structure 104 includes cleat elements 904, e.g., golf cleats (or golf spikes). Other types or styles of cleats and/or other types or styles of traction elements may be provided in other specific examples of this technology.

Figure 9A:
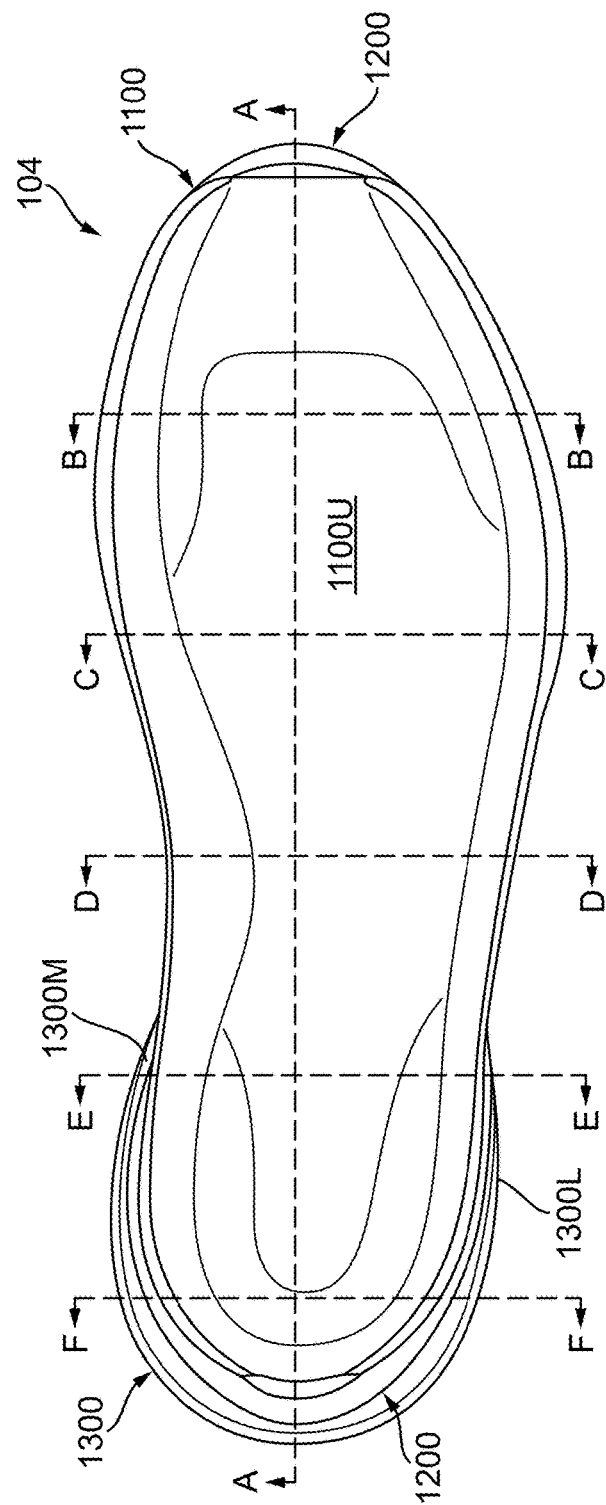
Figure 9B:
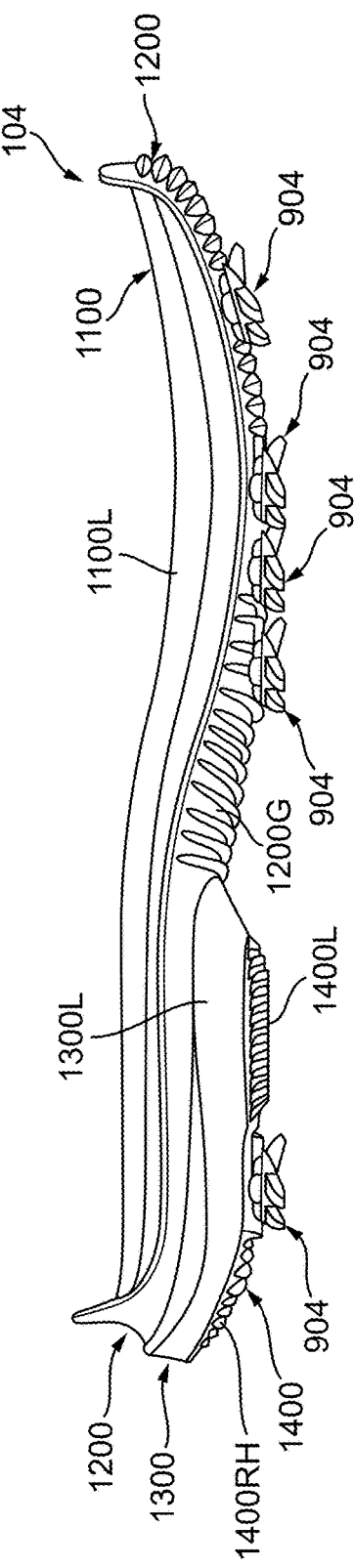
Figure 9E:
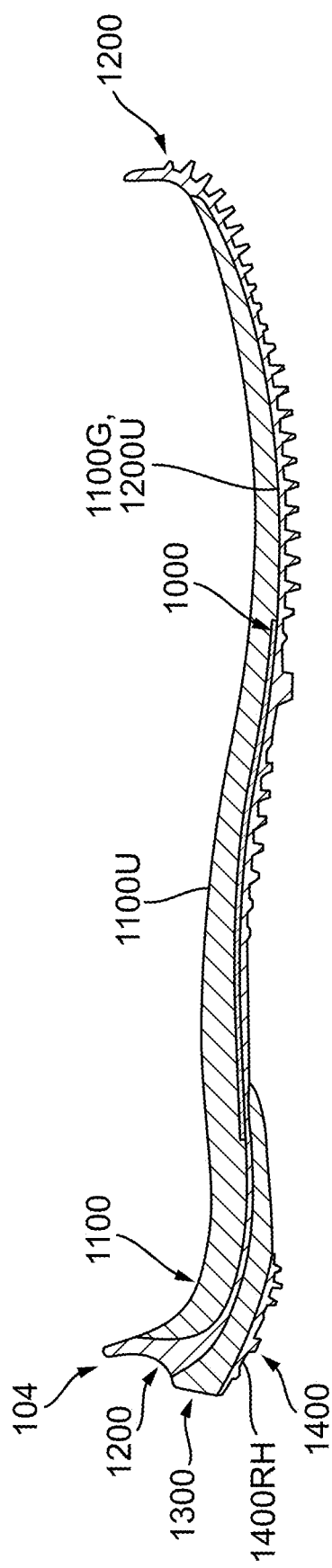
Figure 9G:
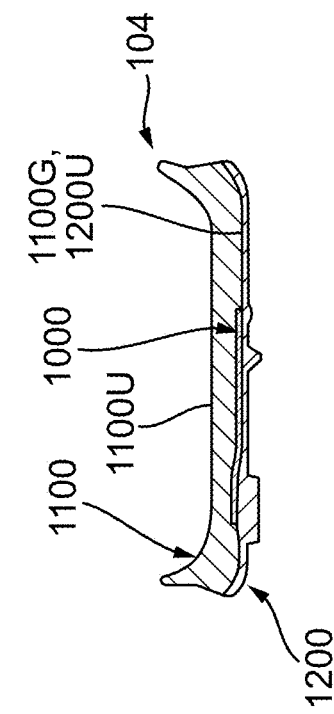
Figure 9F:
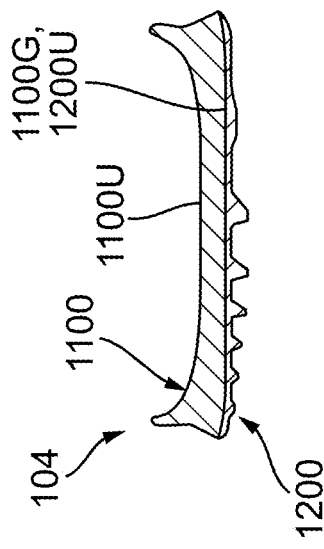
Figure 9H:
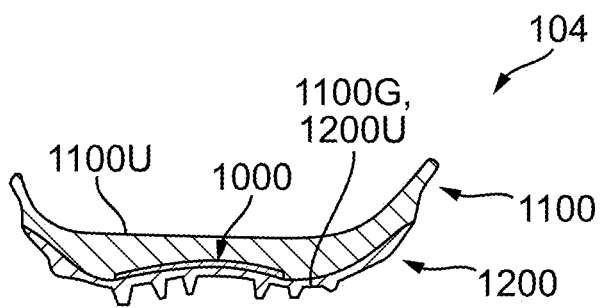
Figure 9I:
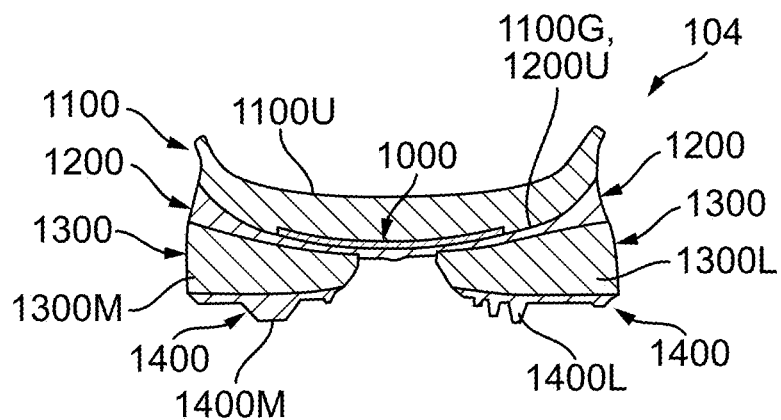
Figure 9J:
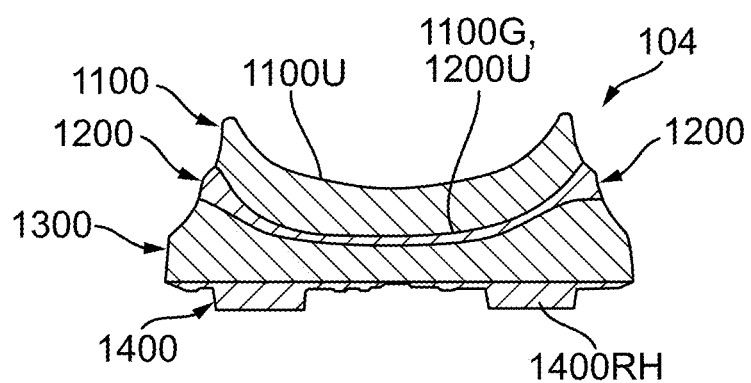
Figure 10:
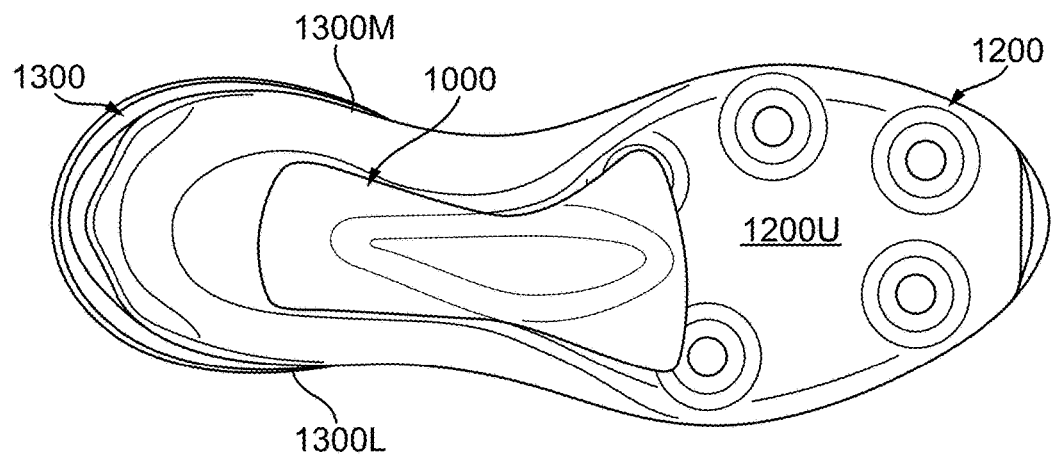
FIG. 10 illustrates a shank plate that may be included in sole structures and articles of footwear in accordance with some aspects of this technology.
Figure 11A:
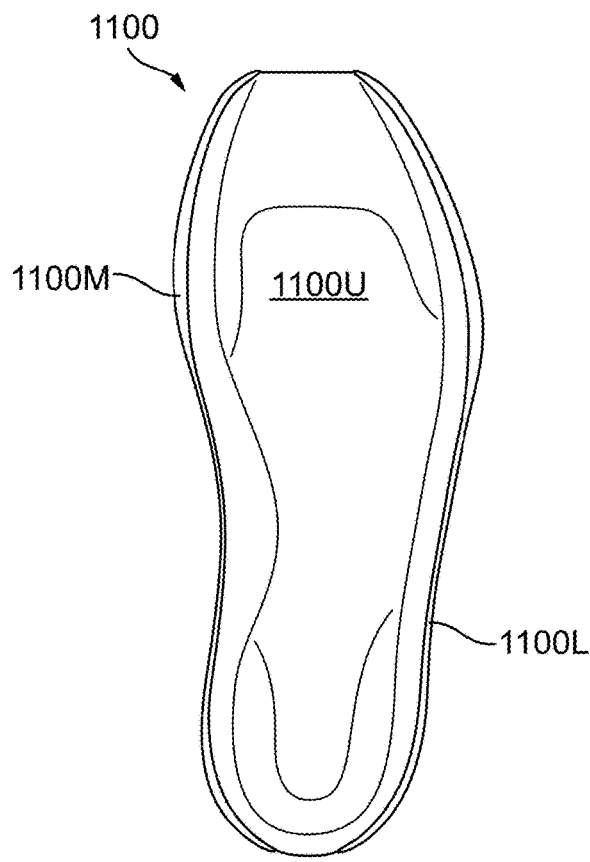
FIGS. 11A and 11B illustrate a midsole component that may be included in sole structures and articles of footwear in accordance with some aspects of this technology.
Figure 11B:
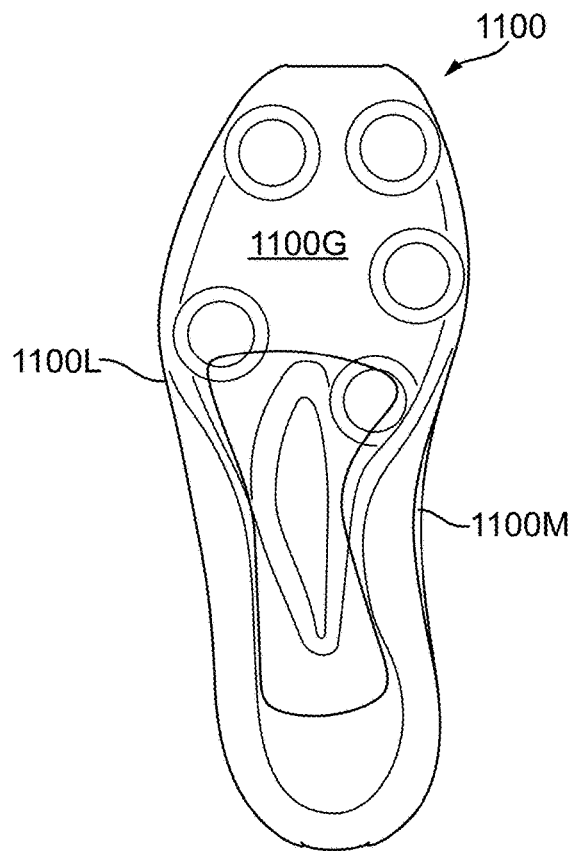
Figure 14A:
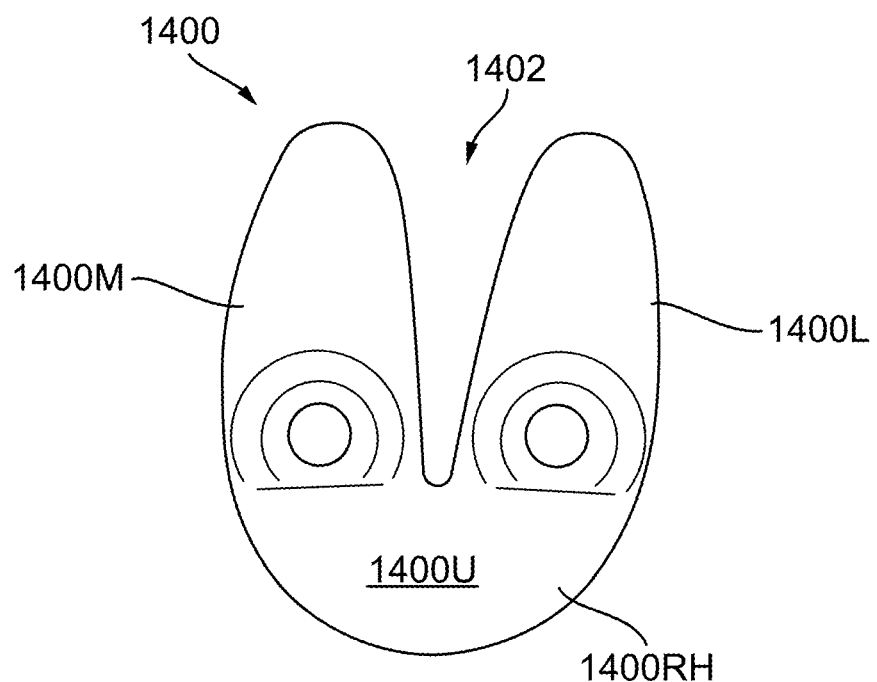
FIGS. 14A and 14B illustrate a heel outsole component that may be included in sole structures and articles of footwear in accordance with some aspects of this technology.
Figure 14B:
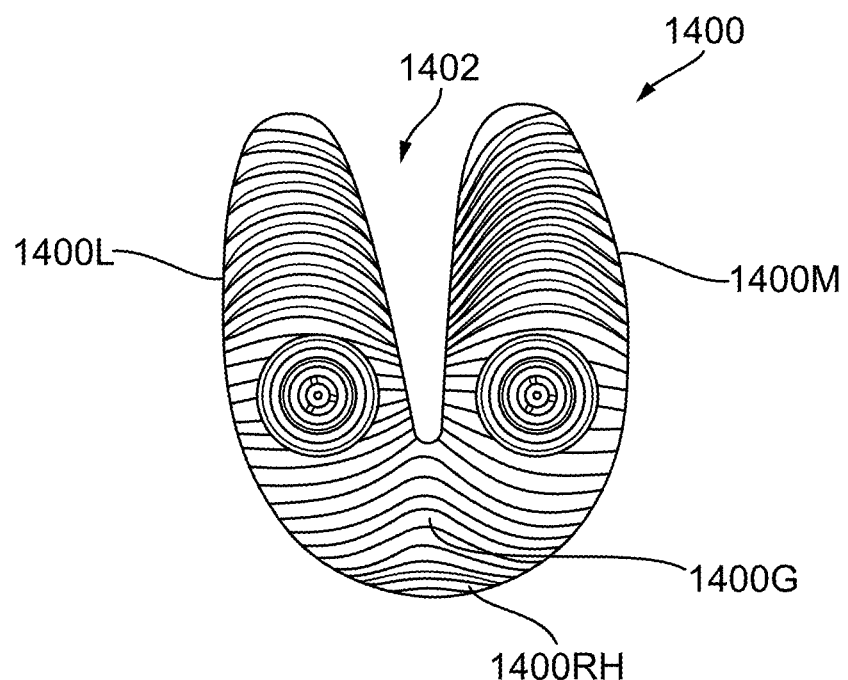

FIGS. 9A-14B show various views of an example sole structure 104 and its component parts in accordance with some examples of this technology. FIG. 9A provides a top view of the sole structure 104; FIG. 9B provides a lateral side view; FIG. 9C provides a medial side view; and FIG. 9D provides a bottom view. FIG. 9E provides a longitudinal section view taken along line A-A in FIG. 9A; FIG. 9F provides a transverse sectional view taken along line B-B in FIG. 9A; FIG. 9G provides a transverse sectional view taken along line C-C in FIG. 9A; FIG. 9H provides a transverse sectional view taken along line D-D in FIG. 9A; FIG. 9I provides a transverse sectional view taken along line E-E in FIG. 9A; and FIG. 9J provides a transverse sectional view taken along line F-F in FIG. 9A. FIG. 10 provides a top view showing a shank member (e.g., a shank plate) 1000 and its location with respect to outsole component 1200. FIGS. 11A and 11B show top and bottom views, respectively, of a midsole component 1100. FIGS. 12A and 12B show top and bottom views, respectively, of an outsole component 1200. FIGS. 13A and 13B show top and bottom views, respectively, of a heel midsole component 1300. FIGS. 14A and 14B show top and bottom views, respectively, of a heel outsole component 1400. These figures and the parts depicted therein are described in more detail below.

Upper midsole component 1100 of this example is a single foam component (e.g., EVA foam, polyurethane foam, etc.) configured to support an entire plantar surface of a wearer's foot. See FIGS. 9A-9J, 11A, and 11B. Thus, the upper midsole component 1100 spans from a rear heel region to a forward toe region of the overall sole structure 104 and article of footwear 100. The upper midsole component 1100 includes an upper-facing surface 1100U and a ground-facing surface 1100G. Portions of a lateral sidewall 1100L and medial sidewall 1100M are exposed at the exterior of the sole structure 104 and article of footwear 100.

Other upper midsole component 1100 structures are possible. For example, the upper midsole component 1100 may include multiple component parts. Additionally or alternatively, the upper midsole component 1100 may include one or more of: one or more fluid-filled bladders, one or more mechanical shock absorbing components, one or more foam components, etc.

The sole structure 104 of this example further includes a first outsole component 1200. This outsole component 1200 may be made from any desired materials, including rubbers, thermoplastic polymers, and/or other materials as are known and used in the footwear arts. As shown in FIGS. 9A-9J, 12A, and 12B, first outsole component 1200 includes an upper-facing surface 1200U and a ground-facing surface 1200G. In this illustrated example, the upper-facing surface 1200U extends to support substantially all of the ground-facing surface 1100G of the upper midsole component 1100 (and thus extends to support substantially all of a plantar surface of the wearer's foot). Further, the upper-facing surface 1200U of the first outsole component 1200 may be engaged with the ground-facing surface 1100G of upper midsole component 1100 (e.g., by adhesive, by mechanical connectors, by sewn seams, by welding techniques, etc.). The ground-facing surface 1200G may include ribs, e.g., to enhance the stiffness, control the flexion, and/or enhance the traction of the sole structure 104. While FIGS. 9D, 12B, and others show a specific rib pattern or arrangement on the ground-facing surface 1200G, many other patterns or arrangements of ribs and/or other stiffness/traction-enhancing elements may be provided, including arrangements with: different numbers of ribs, different spacings of the ribs, different orientations of the ribs, different heights of ribs, different curvatures of the ribs, different shapes of ribs, combinations of ribs with other types of traction-enhancing elements, recesses instead of ribs, etc. At least a portion of at least the ground-facing surface 1200G of the first outsole component 1200 is exposed at the exterior of the sole structure 104 and article of footwear 100. FIG. 9D shows the forefoot region, most of the midfoot region, and some of the heel region of the first outsole component 1200 exposed at the bottom of the sole structure 104.

FIGS. 9E, 9G, 9H, 9I, and 10 further illustrate that this sole structure 104 includes a shank plate 1000 or other arch support component. The shank plate 1000 may be mounted between the ground-facing surface 1100G of the upper midsole component 1100 and the upper-facing surface 1200U of the first outsole component 1200. The shank plate 1000 may be made from any desired materials, such as metals, metal alloys, carbon fiber, other fiber reinforced polymers, thermoplastic polymers, other stiff plastics, etc., including footwear shank and/or arch support materials as are conventionally known and used in the footwear arts. The shank plate 1000 is provided primarily in (and optionally throughout) the midfoot region of the sole structure 104, but it also may extend at least some distance into the heel region and/or the forefoot region (e.g., as shown in FIG. 10). The shank plate 1000 of this example provides additional arch support for the sole structure 104.

The heel region 1200H of the ground-facing surface 1200G of first outsole component 1200 of this example includes a receptacle area for receiving a heel midsole component 1300. See, for example, FIGS. 9A-9E, 9I, 9J, 12B, 13A, and 13B. The upper-facing surface 1300U of the heel midsole component 1300 may be engaged with the ground-facing surface 1200G at the heel region 1200H of the first outsole component 1200, e.g., by adhesive, by mechanical connectors, etc. The upper-facing surface 1300U of the heel midsole component 1300 of this example forms a hollowed out area into which the heel region 1200H of the first outsole component 1200 fits. This example heel midsole component 1300 includes a V-shaped groove 1302 separating a lateral arm 1300L and a medial arm 1300M. The lateral arm 1300L and the medial arm 1300M extend forward from a rear heel support region 1300RH.

The heel midsole component 1300, when present, may take on a wide variety of sizes, shapes, and/other features, including different aesthetic appearances, without departing from this technology. For example, either or both of the arms 1300L and 1300M: may extend forward from the rear heel support region 1300RH a longer or shorter distance from that shown; may extend forward different distances from one another; may have different sizes and/or shapes from those shown and/or from one another; etc. The groove 1302 may have different sizes and/or shapes, or the groove 1302 may be omitted altogether. As yet another option, the entire heel midsole component 1300 may be omitted. Thus, a wide variety of options for the heel midsole component 1300, including a wide variety of different aesthetic appearances from the specific aesthetic appearance shown, may be used.

The sole structure 104 of this example further includes a heel outsole component 1400. See FIGS. 9B-9E, 9I, 9J, 14A, and 14B. This heel outsole component 1400 may be made from any desired materials, including rubbers, thermoplastic polymers, and/or other materials as are known and used in the footwear arts. As shown in FIGS. 14A and 14B, heel outsole component 1400 includes an upper-facing surface 1400U and a ground-facing surface 1400G. In this illustrated example, the upper-facing surface 1400U engages the ground-facing surface 1300G of heel midsole component 1300. The upper-facing surface 1400U of the heel outsole component 1400 may be engaged with the ground-facing surface 1300G of heel midsole component 1300 by one or more of adhesive, mechanical connectors, sewn seams, welding techniques, etc. The ground-facing surface 1400G may include ribs, e.g., to enhance the stiffness and/or traction of the sole structure 104. While FIGS. 9D, 14B, and others show a specific rib pattern or arrangement on the ground-facing surface 1400G, many other patterns or arrangements of ribs and/or other stiffness/traction-enhancing elements may be provided, including arrangements with: different numbers of ribs, different spacings of the ribs, different orientations of the ribs, different heights of ribs, different curvatures of the ribs, different shapes of ribs, combinations of ribs with other types of traction-enhancing elements, recesses instead of ribs, etc. At least a portion of at least the ground-facing surface 1400G of the heel outsole component 1400 is exposed at the exterior of the sole structure 104 and article of footwear 100. In this illustrated example, substantially all of the ground-facing surface 1400G is exposed at the bottom of the sole structure 104.

Further, this example heel outsole component 1400 includes a V-shaped groove 1402 separating a lateral arm 1400L and a medial arm 1400M. The lateral arm 1400L and the medial arm 1400M extend forward from a rear heel support region 1400RH. While some specific structures are illustrated, the heel outsole component 1400 may take on a wide variety of sizes, shapes, and/other features, including different aesthetic appearances, without departing from this technology. For example, either or both of the arms 1400L and 1400M: may extend forward from the rear heel support region 1400RH a longer or shorter distance from that shown; may extend forward different distances from one another; may have different sizes and/or shapes from those shown and/or from one another; etc. The groove 1402 may have different sizes and/or shapes, or the groove 1402 may be omitted altogether. As yet another option, the entire heel outsole component 1400 may be omitted (e.g., and first outsole component 1200 may be configured to contact the ground in the rear heel area). Thus, a wide variety of options for the heel outsole component 1400, including a wide variety of different aesthetic appearances from the specific aesthetic appearance shown, may be used.

One or more of the first outsole component 1200, the heel outsole component 1400, the upper midsole component 1100, and/or the heel midsole component 1300 may include or may be equipped with hardware components for mounting removable cleats 904. Any desired mounting components may be provided, including conventional cleat mounting components as are conventionally known and used in the art. Alternatively, cleats or other types of traction elements may be permanently mounted or provided on the ground-facing surface of the overall sole structure 104.

III. CONCLUSION

The present technology is disclosed above and in the accompanying drawings with reference to a variety of embodiments. The purpose served by the disclosure, however, is to provide an example of the various features and concepts related to this technology, not to limit the scope of the claimed invention. One skilled in the relevant art will recognize that numerous variations and modifications may be made to the embodiments described above without departing from the scope of the presently claimed invention, as defined by the appended claims.

What is claimed is:

1. An upper for an article of footwear, comprising:
   a first upper member formed from one or more component parts, the first upper member including: a first lace-engaging opening having an elongated through hole opening with a length dimension extending in a top-to-bottom direction of the upper and a width dimension extending in a heel-to-toe direction of the upper, wherein the length dimension is at least two times larger than the width dimension;
   a midfoot supporting gusset located inside the first upper member, the midfoot supporting gusset including a first lace-engaging through hole; and
   a lace extending through the first lace-engaging opening and the first lace-engaging through hole such that when the lace is in a tightened condition, the first lace-engaging through hole at least partially aligns with a portion of the first lace-engaging opening, wherein at least a portion of a gusset-engaging region of the lace has a substantially round transverse cross-sectional shape with a largest transverse dimension that is substantially equal to the width dimension.

2. The upper according to claim 1, wherein the first lace-engaging opening has a top end and a bottom end, and wherein when the lace moves from a loosened condition to the tightened condition, the lace moves to the top end of the first lace-engaging opening and pulls a top edge the midfoot supporting gusset upward and/or inward.

3. An upper for an article of footwear, comprising:
   a first upper member formed from one or more component parts, the first upper member including; a first lace-engaging opening having an elongated through hole opening with a length dimension extending in a top-to-bottom direction of the upper and a width dimension extending in a heel-to-toe direction of the upper, wherein the length dimension is at least two times larger than the width dimension;
   a midfoot supporting gusset located inside the first upper member the midfoot supporting gusset including a first lace-engaging through hole;
   a lace extending through the first lace-engaging opening and the first lace-engaging through hole such that when the lace is in a tightened condition, the first lace-engaging through hole at least partially aligns with a portion of the first lace-engaging opening; and
   a forefoot upper member located inside the first upper member and having a rear edge engaged with a forward edge of the midfoot supporting gusset.

4. The upper according to claim 3, wherein a bottom edge of the forefoot upper member extends continuously around a forward toe perimeter of a foot-receiving void of the upper.

5. An upper for an article of footwear, comprising:
   a first upper member formed from one or more component parts, the first upper member including: a first lace-engaging opening having an elongated through hole opening with a length dimension extending in a top-to-bottom direction of the upper and a width dimension extending in a heel-to-toe direction of the upper, wherein the length dimension is at least two times larger than the width dimension;
   a midfoot supporting gusset located inside the first upper member, the midfoot supporting gusset including a first lace-engaging through hole;
   a lace extending through the first lace-engaging opening and the first lace-engaging through hole such that when the lace is in a tightened condition, the first lace-engaging through hole at least partially aligns with a portion of the first lace-engaging opening; and
   a heel upper member located inside the first upper member and having a lateral forward edge engaged with a rearward edge of the midfoot supporting gusset.

6. The upper according to claim 5, wherein a bottom edge of the heel upper member extends continuously around a rear heel perimeter of a foot-receiving void of the upper.

7. An upper for an article of footwear, comprising:
- a first upper member formed from one or more component parts, the first upper member including: a first lateral lace-engaging opening and a first medial lace-engaging opening, wherein each of the first lateral lace-engaging opening and the first medial lace-engaging opening has an elongated through hole opening having a length dimension extending in a top-to-bottom direction of the upper and a width dimension extending in a heel-to-toe direction of the upper, and wherein the length dimension is at least two times larger than the width dimension;
- a lateral gusset located inside the first upper member, the lateral gusset including a first lateral lace-engaging through hole;
- a medial gusset located inside the first upper member, the medial gusset including a first medial lace-engaging through hole, wherein each of the first lateral lace-engaging through hole and the first medial lace-engaging through hole has a substantially round shape with a largest transverse dimension that is substantially equal to the width dimension; and
- a lace extending through the lace-engaging openings and the lace-engaging through holes such that when the lace is in a tightened condition: (i) the first lateral lace-engaging through hole at least partially aligns with a portion of the first lateral lace-engaging opening, and (ii) the first medial lace-engaging through hole at least partially aligns with a portion of the first medial lace-engaging opening.

8. The upper according to claim 7, wherein the first lateral lace-engaging opening has a top end and a bottom end, and wherein when the lace moves from a loosened condition to the tightened condition, the lace moves to the top end of the first lateral lace-engaging opening and pulls a top edge the lateral gusset upward and/or inward, and
- wherein the first medial lace-engaging opening has a top end and a bottom end, and wherein when the lace moves from the loosened condition to the tightened condition, the lace moves to the top end of the first medial lace-engaging opening and pulls a top edge the medial gusset upward and/or inward.

9. The upper according to claim 7, wherein at least a portion of a gusset-engaging region of the lace has a transverse cross-sectional shape that substantially matches a size and shape of the first lateral lace-engaging through hole and a size and shape of the first medial lace-engaging through hole.

10. The upper according to claim 7, further comprising: a forefoot upper member located inside the first upper member and having: (a) a lateral rear edge engaged with a forward edge of the lateral gusset, and (b) a medial rear edge engaged with a forward edge of the medial gusset.

11. The upper according to claim 10, wherein a bottom edge of the forefoot upper member extends continuously around a forward toe perimeter of a foot-receiving void of the upper from the forward edge of the lateral gusset to the forward edge of the medial gusset.

12. The upper according to claim 7, further comprising: a heel upper member located inside the first upper member and having: (a) a lateral forward edge engaged with a rearward edge of the lateral gusset, and (b) a medial forward edge engaged with a rearward edge of the medial gusset.

13. The upper according to claim 12, wherein a bottom edge of the heel upper member extends continuously around a rear heel perimeter of a foot-receiving void of the upper from the rearward edge of the lateral gusset to the rearward edge of the medial gusset.

14. The upper according to claim 7, wherein each of the lateral gusset and the medial gusset extends through a midfoot region of the upper.

15. An upper for an article of footwear, comprising:
- a first upper member formed from one or more component parts, the first upper member including:
  - a first lateral lace-engaging opening,
  - a second lateral lace-engaging opening located forward of the first lateral lace-engaging opening,
  - a first medial lace-engaging opening, and
  - a second medial lace-engaging opening located forward of the first medial lace-engaging opening,
- wherein each of the first lateral lace-engaging opening, the second lateral lace-engaging opening, the first medial lace-engaging opening, and the second medial lace-engaging opening has an elongated through hole opening having a length dimension extending in a top-to-bottom direction of the upper and a width dimension extending in a heel-to-toe direction of the upper, and wherein the length dimension is at least two times larger than the width dimension;
- a lateral gusset located inside the first upper member, the lateral gusset including: (i) a first lateral lace-engaging through hole and (ii) a second lateral lace-engaging through hole;
- a medial gusset located inside the first upper member, the medial gusset including: (i) a first medial lace-engaging through hole and (ii) a second medial lace-engaging through hole, wherein each of the first lateral lace-engaging through hole, the second lateral lace-engaging through hole, the first medial lace-engaging through hole, and the second medial lace-engaging through hole has a substantially round shape with a largest transverse dimension that is substantially equal to the width dimension; and
- a lace extending through the lace-engaging openings and the lace-engaging through holes such that when the lace is in a tightened condition: (i) the first lateral lace-engaging through hole at least partially aligns with a portion of the first lateral lace-engaging opening, (ii) the second lateral lace-engaging through hole at least partially aligns with a portion of the second lateral lace-engaging opening, (iii) the first medial lace-engaging through hole at least partially aligns with a portion of the first medial lace-engaging opening, and (iv) the second medial lace-engaging through hole at least partially aligns with a portion of the second medial lace-engaging opening.

16. The upper according to claim 15, wherein each of the first lateral lace-engaging opening and the second lateral lace-engaging opening has a top end and a bottom end, and wherein when the lace moves from a loosened condition to the tightened condition, the lace moves to the top end of each of the first lateral lace-engaging opening and the second lateral lace-engaging opening and pulls a top edge the lateral gusset upward and/or inward, and
- wherein each of the first medial lace-engaging opening and the second medial lace-engaging opening has a top end and a bottom end, and wherein when the lace moves from the loosened condition to the tightened condition, the lace moves to the top end of each of the first medial lace-engaging opening and the second medial lace-engaging opening and pulls a top edge the medial gusset upward and/or inward.

17. The upper according to claim 15, wherein at least a portion of a gusset-engaging region of the lace has a transverse cross-sectional shape that substantially matches a size and shape of the first lateral lace-engaging through hole and a size and shape of the first medial lace-engaging through hole.

18. The upper according to claim 15, further comprising: a forefoot upper member located inside the first upper member and having: (a) a lateral rear edge engaged with a forward edge of the lateral gusset, and (b) a medial rear edge engaged with a forward edge of the medial gusset, wherein a bottom edge of the forefoot upper member extends continuously around a forward toe perimeter of a foot-receiving void of the upper from the forward edge of the lateral gusset to the forward edge of the medial gusset; and a heel upper member located inside the first upper member and having: (a) a lateral forward edge engaged with a rearward edge of the lateral gusset, and (b) a medial forward edge engaged with a rearward edge of the medial gusset, wherein a bottom edge of the heel upper member extends continuously around a rear heel perimeter of the foot-receiving void of the upper from the rearward edge of the lateral gusset to the rearward edge of the medial gusset.

19. The upper according to claim 3, wherein at least a portion of a gusset-engaging region of the lace has a substantially round transverse cross-sectional shape with a largest transverse dimension that is substantially equal to the width dimension.

20. The upper according to claim 3, wherein at least a portion of a gusset-engaging region of the lace has a transverse cross-sectional shape that substantially matches a size and shape of the first lace-engaging through hole.

\* \* \* \* \*